United States Patent
Erikawa et al.

(10) Patent No.: US 10,292,524 B2
(45) Date of Patent: May 21, 2019

(54) BEVERAGE EXTRACTION DEVICE

(71) Applicant: FUJI ELECTRIC CO., LTD., Kawasaki-shi, Kanagawa (JP)

(72) Inventors: Hajime Erikawa, Kumagaya (JP); Yohei Nishikawa, Yokkaichi (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 103 days.

(21) Appl. No.: 15/586,926

(22) Filed: May 4, 2017

(65) Prior Publication Data

US 2017/0325618 A1 Nov. 16, 2017

(30) Foreign Application Priority Data

May 10, 2016 (JP) .................................. 2016-094436
Jul. 6, 2016 (JP) .................................. 2016-134125
Jul. 6, 2016 (JP) .................................. 2016-134275
Apr. 5, 2017 (JP) .................................. 2017-075298

(51) Int. Cl.
*A47J 31/36* (2006.01)
*A47J 31/44* (2006.01)

(52) U.S. Cl.
CPC ........... *A47J 31/36* (2013.01); *A47J 31/4403* (2013.01)

(58) Field of Classification Search
CPC ........ A47J 31/36; A47J 31/4403; A47J 31/60; A47J 31/42; A47J 31/18
See application file for complete search history.

(56) References Cited

U.S. PATENT DOCUMENTS

| | | | | |
|---|---|---|---|---|
| 5,153,016 A | * | 10/1992 | Gockelmann | A47J 31/057 426/433 |
| 5,349,897 A | * | 9/1994 | King | A47J 31/18 99/287 |
| 5,406,882 A | * | 4/1995 | Shaanan | A47J 31/18 99/287 |
| 5,638,739 A | * | 6/1997 | Shaanan | A47J 31/18 99/287 |
| 7,673,555 B2 | | 3/2010 | Nosler et al. | |
| 8,371,211 B2 | | 2/2013 | Nosler et al. | |
| 8,621,982 B2 | | 1/2014 | Nosler et al. | |
| 8,794,127 B2 | | 8/2014 | Nosler et al. | |

(Continued)

FOREIGN PATENT DOCUMENTS

JP 4760549 B2 8/2011
WO 2007/035877 A2 3/2007

*Primary Examiner* — Eric Keasel
(74) *Attorney, Agent, or Firm* — Manabu Kanesaka

(57) ABSTRACT

A beverage extraction device includes a cylinder having a bottomed cylindrical shape; a piston member configured to move close to and away from a bottom portion of the cylinder, the beverage extraction device being configured to extract a beverage from a beverage raw material and hot water that are fed through an upper surface opening of the cylinder by a movement of the piston member and discharge the extracted beverage through a discharge passage connected to the bottom portion; and a cover member configured to move between a fully opened position and a fully closed position. The cover member includes a scraper portion configured to remove an extraction residue placed on the piston member closing the upper surface opening when the cover member moves from one to another of the fully opened position and the fully closed position.

6 Claims, 26 Drawing Sheets

(56) References Cited

U.S. PATENT DOCUMENTS

| | | | |
|---|---|---|---|
| 8,950,318 B2 * | 2/2015 | Ford | A47J 31/18 426/433 |
| 2014/0170280 A1 | 6/2014 | St. Germain et al. | |
| 2015/0107459 A1 | 4/2015 | St. Germain et al. | |
| 2015/0157039 A1 | 6/2015 | Nosler et al. | |

* cited by examiner

BEVERAGE EXTRACTION DEVICE

CROSS-REFERENCE TO RELATED APPLICATION(S)

The present application claims priority to and incorporates by reference the entire contents of Japanese Patent Application No. 2016-094436 filed in Japan on May 10, 2016, Japanese Patent Application No. 2016-134125 filed in Japan on Jul. 6, 2016, Japanese Patent Application No. 2016-134275 filed in Japan on Jul. 6, 2016, and Japanese Patent Application No. 2017-075298 filed in Japan on Apr. 5, 2017.

BACKGROUND

1. Technical Field

The disclosure relates to a beverage extraction device, more specifically, a beverage extraction device applied to a beverage server and a cup-type automatic beverage vending machine, for example.

2. Related Art

For example, a conventionally known beverage extraction device applied to a coffee server (beverage server) and a cup-type automatic beverage vending machine includes a cylinder, a filter block, and a cylinder head.

The cylinder is an extraction container having a cylindrical shape. The filter block is incorporated with a filter, and opens and closes the lower surface opening of the cylinder. The cylinder head opens and closes the upper surface opening of the cylinder.

In the beverage extraction device having the above structure, a beverage is extracted in the following manner. A beverage raw material and hot water are respectively fed into the cylinder the lower surface opening of which is closed by the filter block, from a raw material supply device and a hot water supply device, through the opened upper surface opening. The beverage raw material and the hot water fed into the cylinder are stirred by air that is supplied into the cylinder by the drive of an air pump, from a first air supply passage coupled to the filter block. The supply of air from the first air supply passage is stopped when the driving of the air pump is stopped.

Then, the upper surface opening of the cylinder is closed by the cylinder head, and air is supplied into the cylinder from a second air supply passage coupled to the cylinder head, by the drive of the air pump. An extraction passage coupled to the filter block is also opened. Consequently, the stirred liquid inside the cylinder is extracted as a beverage through the filter of the filter block, passes through the extraction passage, and is discharged outside.

In the beverage extraction device described above, after the beverage is extracted and discharged, the filter block and the cylinder head are separated from the cylinder. An extraction residue on the filter of the filter block is then scraped off and removed from the filter block, by moving a scraper (for example, see Japanese Patent No. 4760549).

SUMMARY

In the beverage extraction device described above, the extraction residue on the filter of the filter block is scraped off and removed using the scraper. Thus, a residue receptacle for holding the extraction residue removed by the scraper needs to be disposed in an area below the cylinder.

When an attempt is made to ensure sufficient capacity for the residue receptacle, the height dimension of the combination of the beverage extraction device and the residue receptacle will be increased. However, the height dimension or the like of a casing of the coffee server or the like to which the beverage extraction device is to be installed, is limited. Thus, it has been difficult to ensure sufficient capacity for the residue receptacle. When the sufficient capacity of the residue receptacle cannot be ensured as the above, the extraction residue collected in the residue receptacle needs to be discarded frequently, which is not preferable.

In view of the above circumstances, it is desirable to provide a beverage extraction device that can increase the storage amount of extraction residue.

In some embodiments, a beverage extraction device includes: a cylinder having a bottomed cylindrical shape; a piston member including a plurality of through holes and having a disk shape, the piston member being configured to move close to and away from a bottom portion of the cylinder in a state that a side surface of the piston member is in contact with an inner surface of the cylinder, the beverage extraction device being configured to extract a beverage from a beverage raw material and hot water that are fed through an upper surface opening of the cylinder by a movement of the piston member and discharge the extracted beverage through a discharge passage connected to the bottom portion; and a cover member configured to move between a fully opened position at which the upper surface opening is fully opened and a fully closed position at which the upper surface opening is closed. The cover member includes a scraper portion configured to remove an extraction residue placed on the piston member closing the upper surface opening when the cover member moves from one to another of the fully opened position and the fully closed position.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, a preferred embodiment of a beverage extraction device according to the disclosure will be described in detail with reference to the accompanying drawings.

Figure 1:
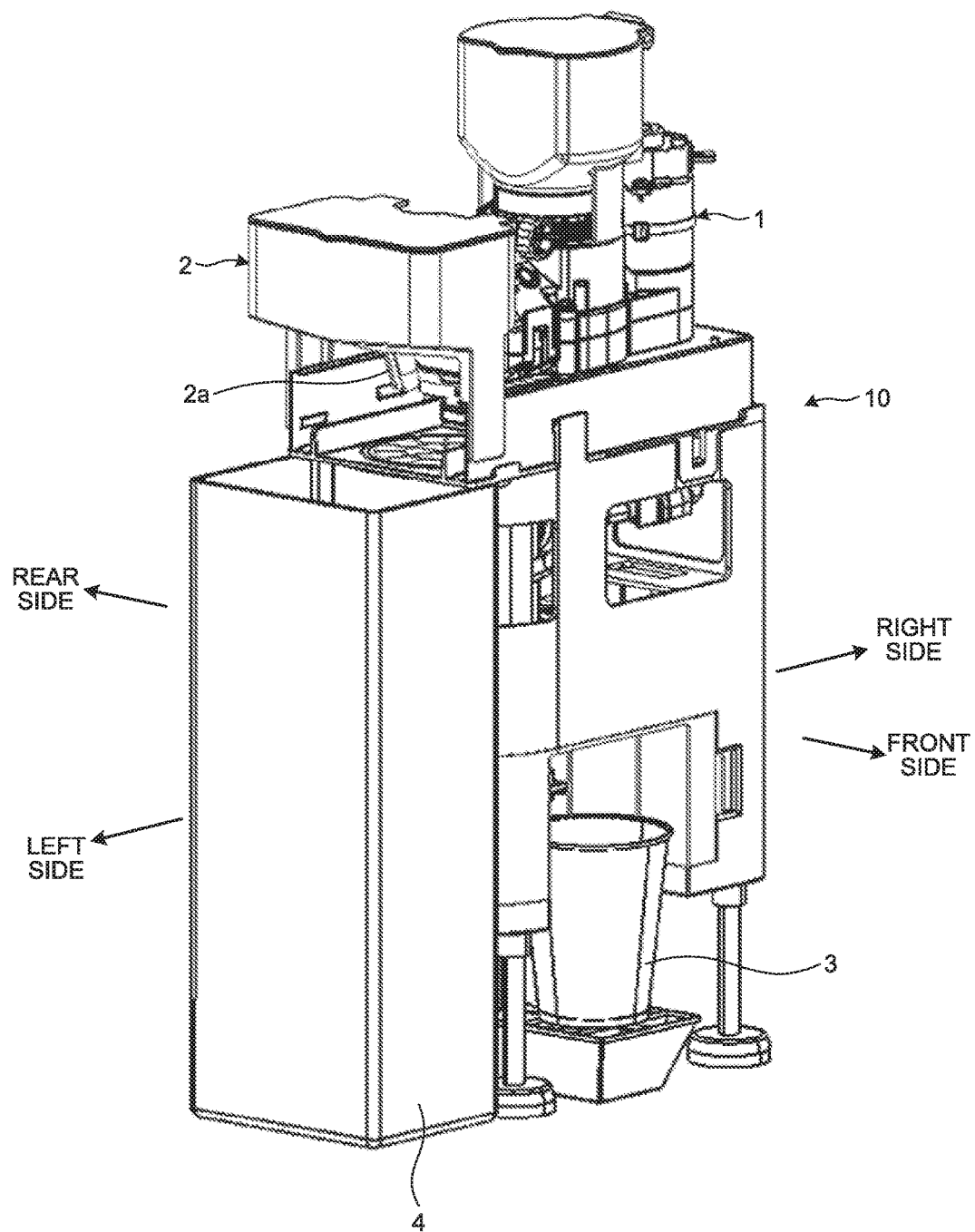
FIG. 1 is a perspective view illustrating a beverage extraction device according to an embodiment of the disclosure.

FIG. 1 is a perspective view illustrating a beverage extraction device according to an embodiment of the disclosure. A beverage extraction device 10 exemplified in this example is to be applied to a beverage server, a cup-type automatic beverage vending machine, or the like that provides beverages such as coffee and tea. The beverage extraction device 10 extracts a coffee beverage from a coffee raw material (ground beans: beverage raw material) that is supplied through a supply port 1a (see FIG. 9) of a mill (supply unit) 1 and hot water that is supplied from a hot water supply unit 2, and discharges the coffee beverage.

The hot water supply unit 2 is provided at the left side of the mill 1, and includes a hot water passage 2a through which hot water supplied from a hot water tank, which is not illustrated, is passed.

Figure 2:
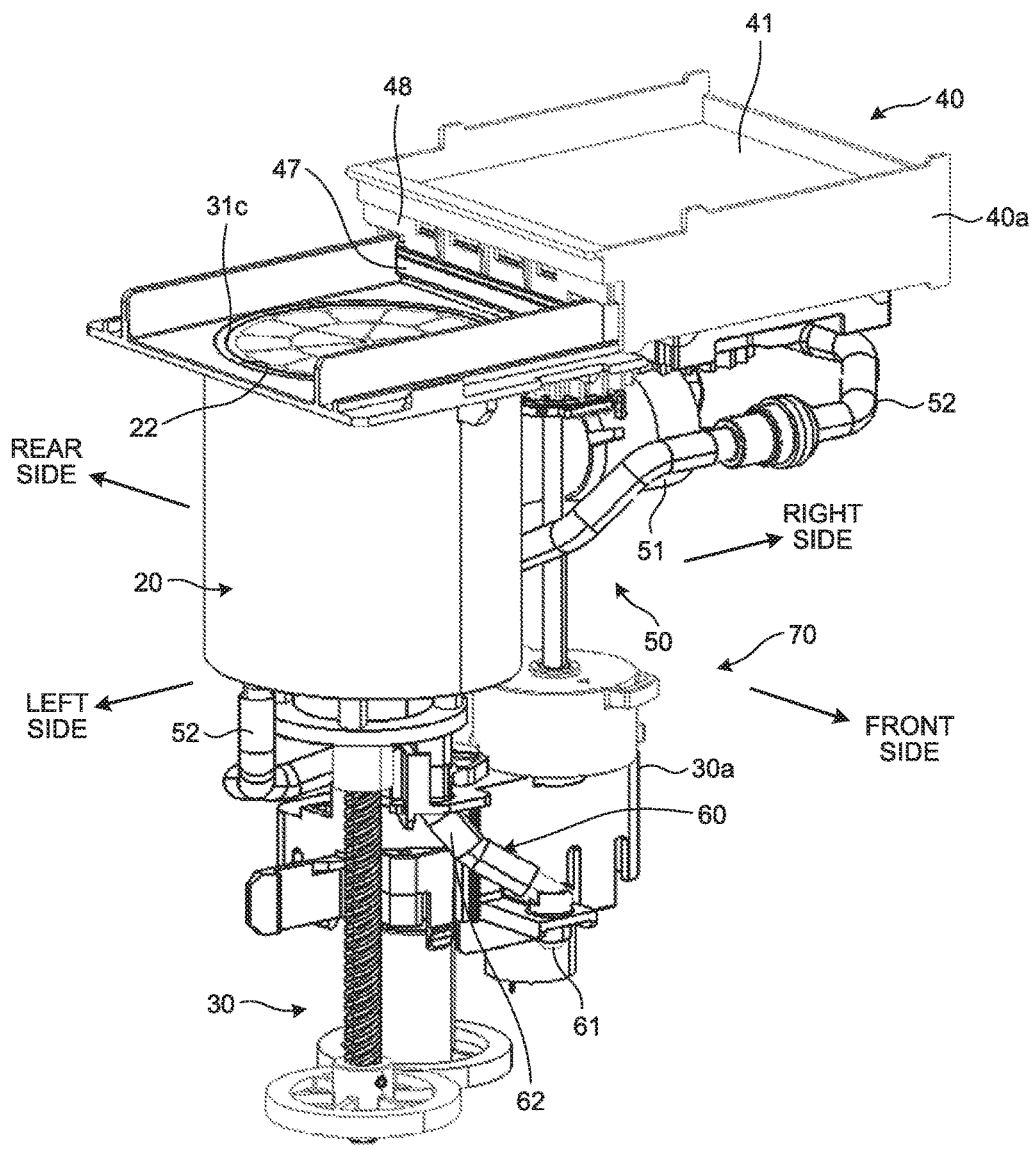
FIG. 2 is a perspective view illustrating a main part of the beverage extraction device illustrated in FIG. 1.
Figure 3:
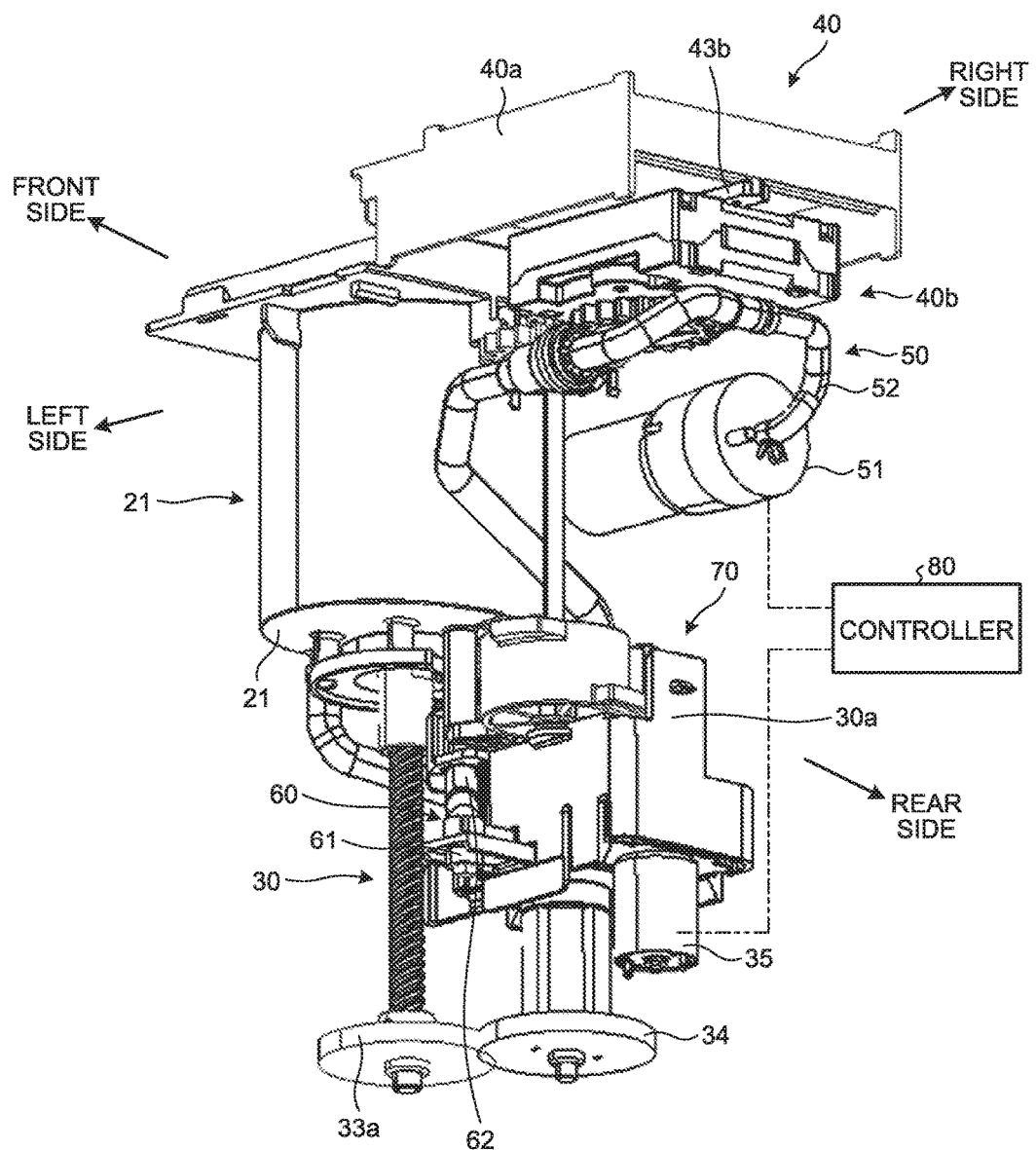
FIG. 3 is a perspective view illustrating the main part of the beverage extraction device illustrated in FIG. 1.

FIGS. 2 and 3 are perspective views each illustrating a main part of the beverage extraction device 10 illustrated in FIG. 1. As illustrated in FIGS. 2 and 3, the beverage extraction device 10 includes a cylinder 20, a piston unit 30, a cover unit 40, an air supply passage 50, a discharge passage 60, and a regulation unit 70.

The cylinder 20 has a bottomed cylindrical shape, and a bottom portion 21 closes the lower surface opening of the cylinder 20. The cylinder 20 such as the above is installed so that the axial direction of the cylinder 20 is aligned with the vertical direction.

Figure 4:
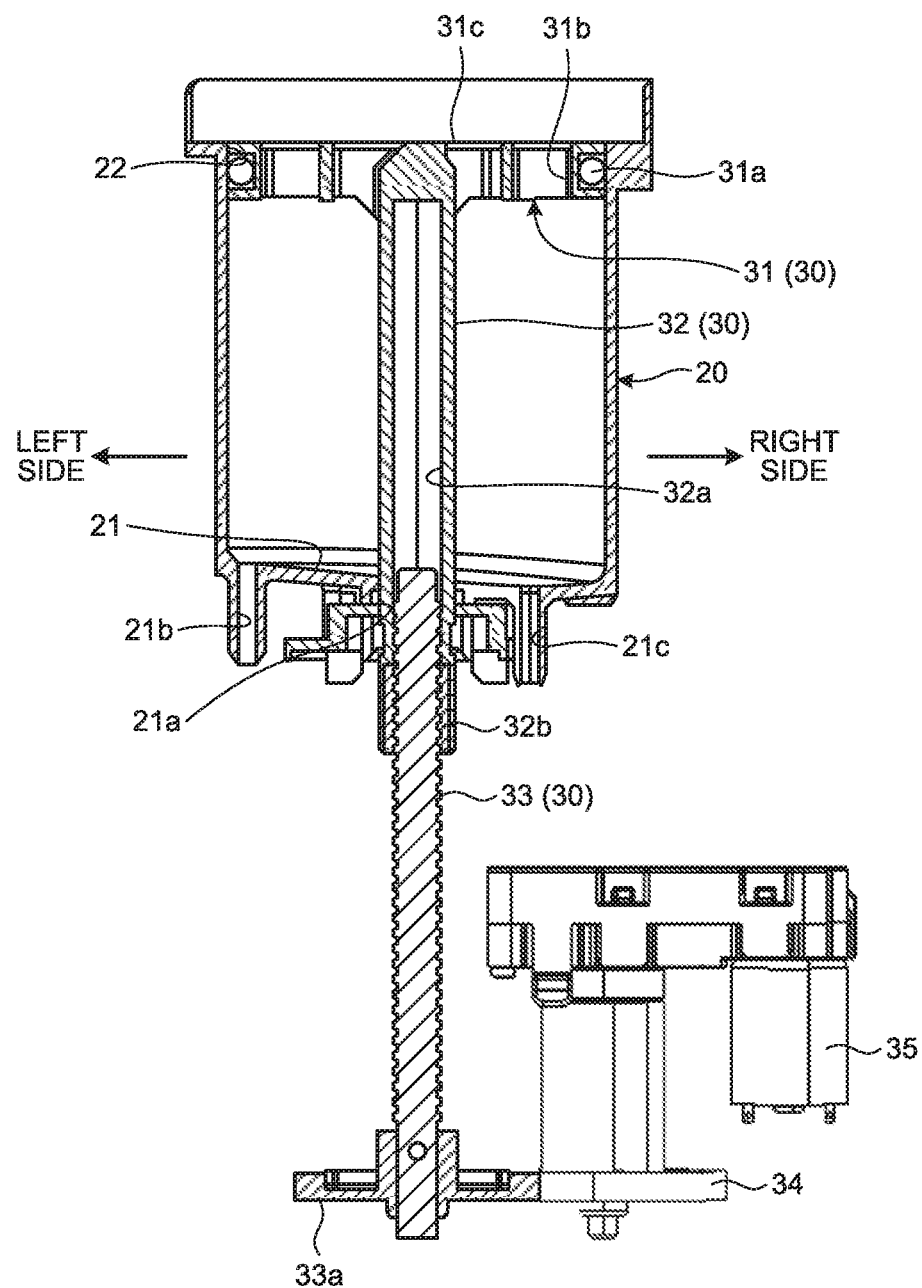
FIG. 4 is a sectional view illustrating a part of a cylinder and a piston unit illustrated in FIG. 2 and FIG. 3.
Figure 5:
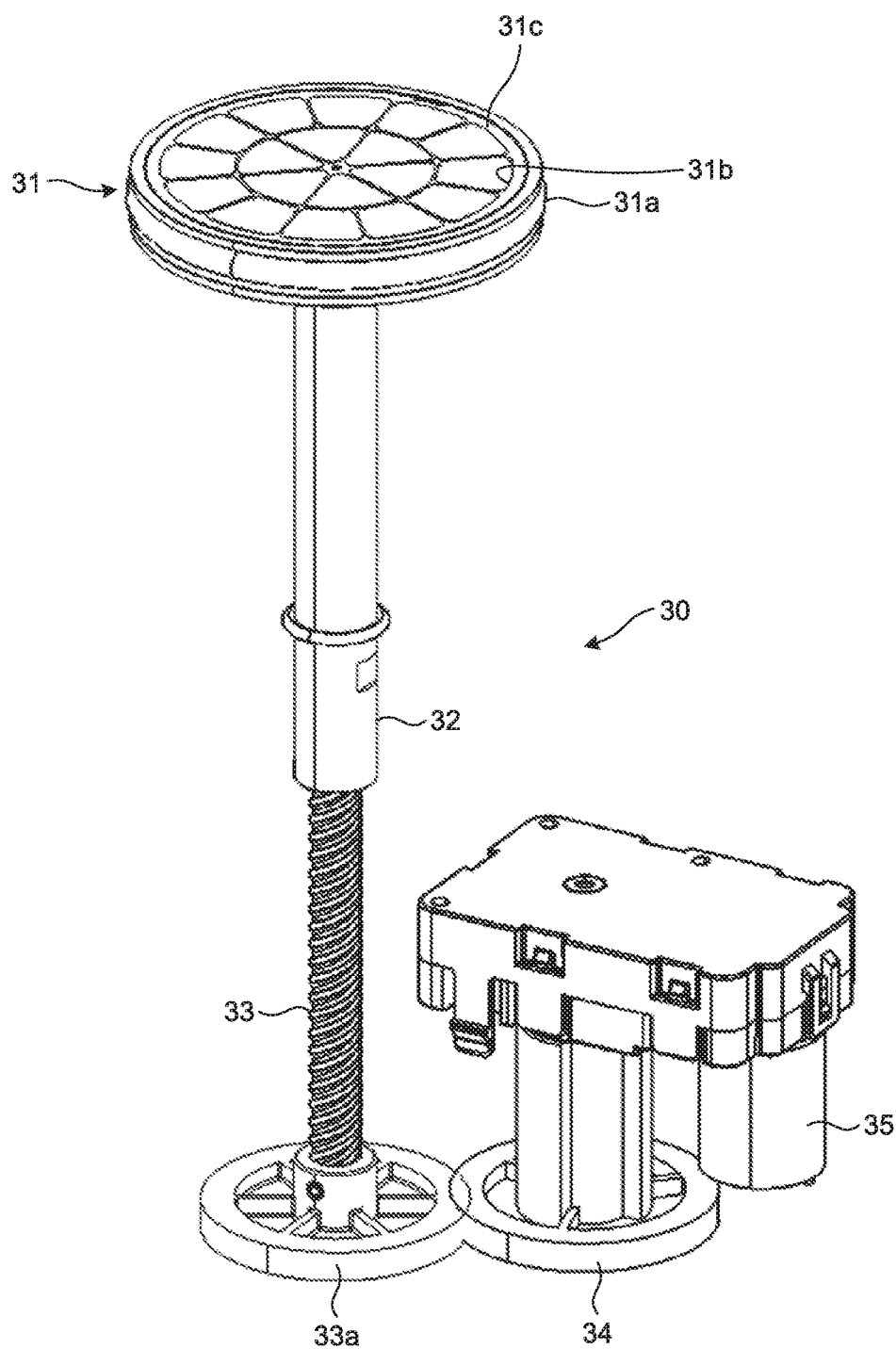
FIG. 5 is a perspective view illustrating the piston unit illustrated in FIG. 2 and FIG. 3.

As also illustrated in FIGS. 4 and 5, the piston unit 30 includes a piston member 31, a feed nut unit 32, and a feed screw unit 33.

The piston member 31 has a disk shape, and is formed of a metal material, for example. Packing 31a is fixed to the periphery of the piston member 31, and the packing 31a is in contact with the inner surface of the cylinder 20. A plurality of through holes 31b are formed on the piston member 31 so as to penetrate in the vertical direction. A mesh member 31c having a disk shape is mounted on the upper surface of the piston member 31 so as to cover the through holes 31b.

The feed nut unit 32 is an elongated member the longitudinal direction of which is aligned with the vertical direction. The feed nut unit 32 is fixed to the center portion of the lower surface of the piston member 31. The feed nut unit 32 has a cylindrical shape, and the piston member 31 closes an upper surface opening 22 of the feed nut unit 32. The feed nut unit 32 penetrates through a nut hole 21a that is formed on the center portion of the bottom portion 21. In this example, the outer diameter of the feed nut unit 32 is slightly smaller than the inner diameter of the nut hole 21a, and the airtightness is ensured by providing packing and the like in a gap between the feed nut unit 32 and the nut hole 21a. The feed nut unit 32 such as the above has a hollow portion 32a that extends in the vertical direction, and a nut 32b is provided at the lower side of the hollow portion 32a such as the above.

The feed screw unit 33 is an elongated member the longitudinal direction of which is aligned with the vertical direction. A part of the feed screw unit 33 enters the hollow portion 32a of the feed nut unit 32 and is screwed to the inner surface of the nut 32b. A feed screw gear 33a fitted to the lower end of the feed screw unit 33 such as the above is meshed with a piston connecting gear 34. The piston connecting gear 34 rotates around the center axis of the feed screw unit 33 when a piston motor 35 is driven. In other words, the feed screw unit 33 is connected to the piston motor 35. In this example, the piston motor 35 is driven in a normal rotation direction and a reverse rotation direction according to an instruction from a controller 80.

In this example, the controller 80 is a controller that integrally controls the operation of the beverage extraction device 10 based on a computer program and data stored in memory, which is not illustrated. For example, the controller 80 may be implemented by causing a processing device such as a central processing unit (CPU) to execute a computer program, that is, by software; may be implemented by hardware such as an integrated circuit (IC); or may be implemented by a combination of software and hardware.

When the piston motor 35 is driven in the normal rotation direction, the feed screw unit 33 described above rotates around the own center axis clockwise when viewed from the above, for example, and causes the feed nut unit 32 into which the feed screw unit 33 is screwed to move downward. When the piston motor 35 is driven in the reverse rotation direction, the feed screw unit 33 rotates around the center axis counterclockwise when viewed from the above, for example, and causes the feed nut unit 32 to move upward.

In this manner, when the feed nut unit 32 moves along the vertical direction with the rotation of the feed screw unit 33, the piston member 31 can approach to and separate from the bottom portion 21, while the side surface of the piston member 31 is in contact with the inner surface of the cylinder 20. For the movement of the piston member 31, the controller 80 can identify the position of the piston member 31, by detecting the rotational drive of the piston motor 35 using a switch.

Figure 6:
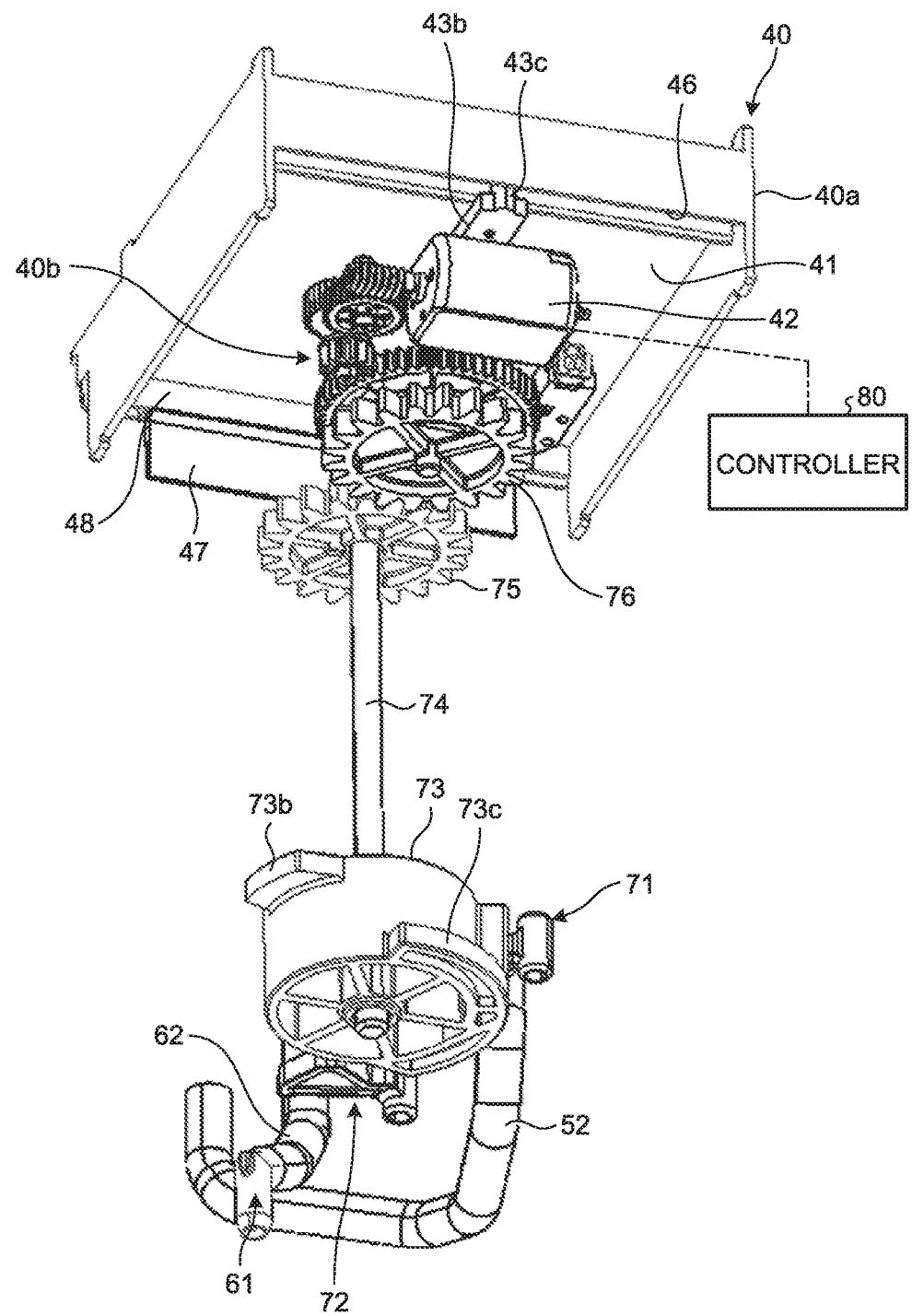
FIG. 6 is a perspective view illustrating a main part of a cover unit and a regulation unit illustrated in FIG. 2 and FIG. 3.

As also illustrated in FIG. 6, the cover unit 40 includes a cover member 40*a* and a cover driving unit 40*b*. The cover member 40*a* is disposed in an area above the cylinder 20. The cover member 40*a* such as the above has a box shape the lower wall portion of which is opened, and an upper wall portion 41 has a size large enough to cover the upper surface opening 22 of the cylinder 20.

Figure 7:
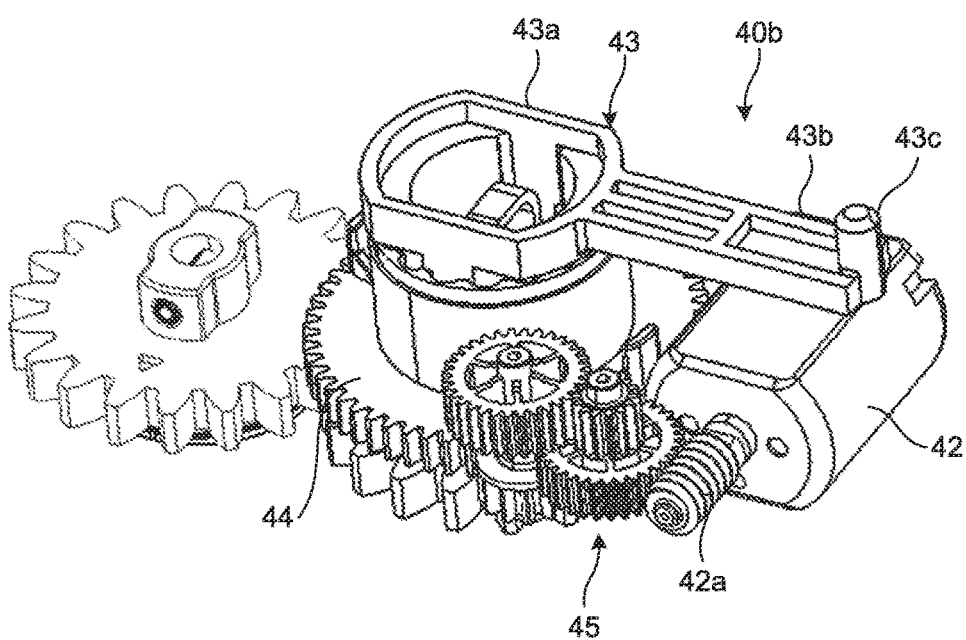
FIG. 7 is a perspective view illustrating components of the cover unit illustrated in FIG. 6.

As illustrated in FIG. 7, the cover driving unit 40*b* includes a cover motor 42 and a cover lever 43. The cover motor 42 rotates and drives an output shaft 42*a* in one direction according to an instruction from the controller 80 described above.

The cover lever 43 includes a base portion 43*a* and an arm portion 43*b*. Although not illustrated in the drawing, the base portion 43*a* includes a clip projecting downward that is engaged with a lever gear 44. Thus, the base portion 43*a* is integrally provided with the lever gear 44. The lever gear 44 is meshed with a lever connecting gear 45. In this example, a part of the lever connecting gear 45 is meshed with the output shaft 42*a* of the cover motor 42. Consequently, the lever gear 44 is connected to the cover motor 42, and the cover lever 43 that includes the base portion 43*a* integrally provided with the lever gear 44 described above is also connected to the cover motor 42. In other words, when the cover motor 42 is driven, the cover lever 43 rotates around the center axis of the lever gear 44 clockwise when viewed from the above.

The arm portion 43*b* extends in a radially outward direction of the base portion 43*a* from the base portion 43*a*, and an arm projection 43*c* projecting upward is provided on the tip end portion of the arm portion 43*b*. As illustrated in FIG. 6, the arm projection 43*c* enters an engagement groove 46 that is provided on the right end of the cover member 40*a* along the front-back direction.

Consequently, when the cover motor 42 is driven to rotate the cover lever 43 clockwise when viewed from the above, the arm projection 43*c* slidably moves in the engagement groove 46. Thus, the cover member 40*a* described above moves along the horizontal direction.

More specifically, the cover member 40*a* is provided to move between the right end position (fully opened position) where the upper surface opening 22 is fully opened, and the left end position (fully closed position) where the upper surface opening 22 is closed. For the rotation of the cover lever 43, in other words, for the movement of the cover member 40*a* along the horizontal direction, the controller 80 can identify the position of the cover member 40*a*, by detecting a projection provided on the lever gear 44 using a switch.

The cover member 40*a* described above includes a scraper portion 47. The scraper portion 47 is fixed to a left wall portion 48 of the cover member 40*a*. The vertical dimension of the scraper portion 47 is determined so that the lower end portion of the scraper portion 47 comes into contact with the upper surface of the cylinder 20 in a slidable manner when the cover member 40*a* moves between the right end position and the left end position.

The tip end portion of the air supply passage 50 is coupled to the bottom portion 21 so as to communicate with a supply hole 21*b* (see FIG. 4) provided on the bottom portion 21, and the base end portion of the air supply passage 50 includes a supply pipe line 52 that is coupled to an air pump (air supply unit) 51 and that is made of resin such as rubber. In this example, the air pump 51 is driven according to an instruction from the controller 80 described above.

The base end portion of the discharge passage 60 is coupled to the bottom portion 21 so as to communicate with a discharge hole 21*c* (see FIG. 4) provided on the bottom portion 21. The discharge passage 60 includes a discharge pipe line 62 that has a nozzle 61 fixed to the tip end portion thereof and that is made of resin such as rubber.

The regulation unit 70 includes a supply regulation piece (air supply regulation member) 71, a discharge regulation piece (discharge regulation member) 72, and a regulation cum 73.

Figure 8:
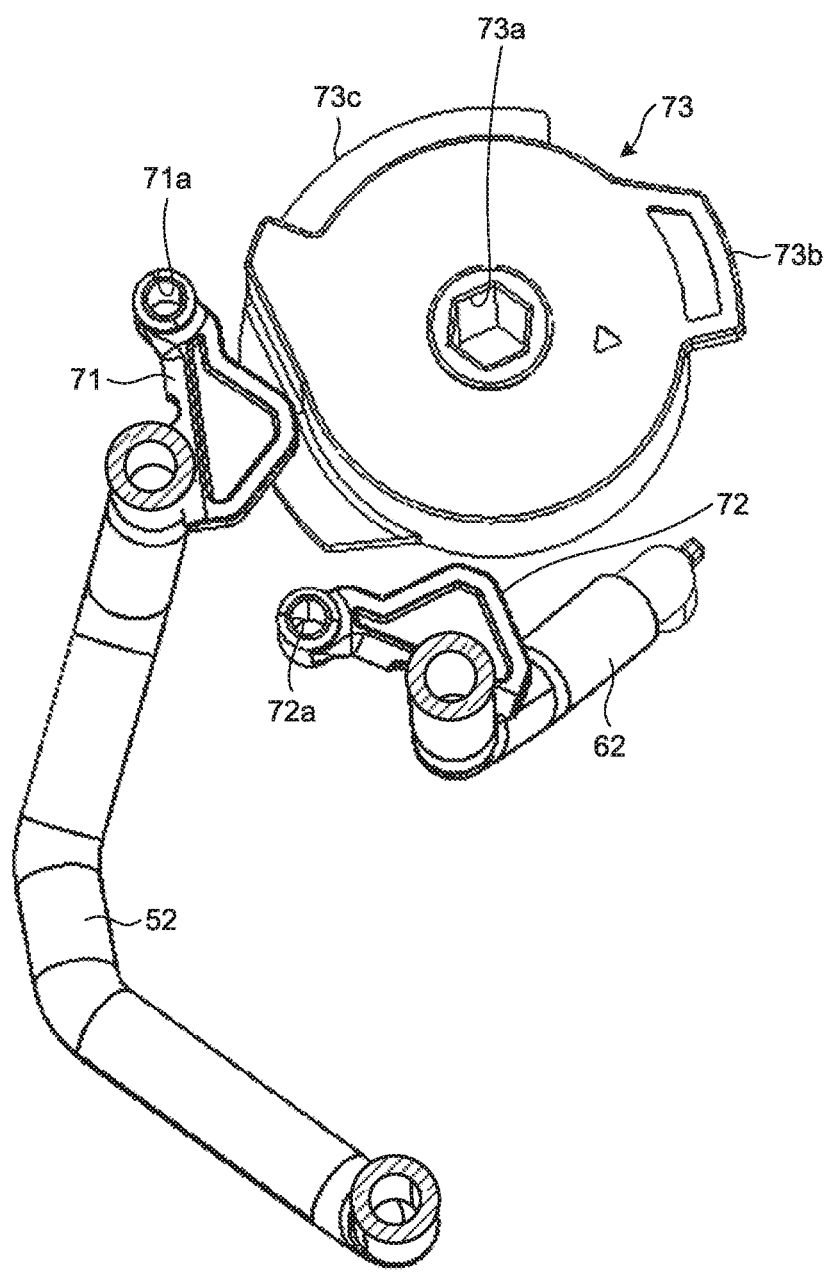
FIG. 8 is a sectional view illustrating the regulation unit.

As illustrated in FIG. 8, the supply regulation piece 71 is provided between the supply pipe line 52 and the regulation cum 73. A first support projection (not illustrated) of a support member 30*a* (see FIGS. 2 and 3) that supports the piston motor 35 and the like penetrates through a first support hole 71*a* provided on an end portion of the supply regulation piece 71 from below. Consequently, the supply regulation piece 71 can swing around the center axis of the first support hole 71*a*. In a normal condition, the supply regulation piece 71 is in an opened state by being urged by the elastic restoring force of the supply pipe line 52.

As illustrated in FIG. 8, the discharge regulation piece 72 is provided between the discharge pipe line 62 and the regulation cum 73. A second support projection (not illustrated) of the support member 30*a* that supports the piston motor 35 and the like penetrates through a second support hole 72*a* provided on an end portion of the discharge regulation piece 72 from below. Consequently, the discharge regulation piece 72 can swing around the center axis of the second support hole 72*a*. In a normal condition, the discharge regulation piece 72 is in an opened state by being urged by the elastic restoring force of the discharge pipe line 62.

The regulation cum 73 has a substantially columnar shape. A regulation rod 74 penetrates through a regulation through hole 73*a* having a hexagonal shape formed at the center portion of the regulation cum 73. Consequently, the regulation cum 73 is integrally provided with the regulation rod 74.

A regulation gear 75 is provided on the upper end portion of the regulation rod 74 described above. The regulation gear 75 is meshed with a regulation connecting gear 76 that is integrally provided with the lever gear 44 described above in a rotatable manner.

In other words, the regulation cum 73 is connected to the lever gear 44 via the regulation rod 74, the regulation gear 75, and the regulation connecting gear 76, and as described above, the lever gear 44 is connected to the cover motor 42. Consequently, the regulation cum 73 is also connected to the cover motor 42.

When the cover motor 42 is driven, the regulation cum 73 rotates counterclockwise when viewed from the above. In this manner, the cover motor 42 is a drive source commonly used by the cover member 40*a* (cover lever 43) described above and the regulation cum 73.

A first regulation projection 73*b* and a second regulation projection 73*c* are provided on the side peripheral portion of the regulation cum 73 described above. The first regulation projection 73*b* projects outward corresponding to the height level where the supply regulation piece 71 is installed. The second regulation projection 73*c* projects outward corresponding to the height level where the discharge regulation piece 72 is installed. The first regulation projection 73*b* and the second regulation projection 73*c* are provided in respective predetermined areas of the side peripheral portion of the regulation cum 73, and are provided in an area required for discharging a coffee beverage, as will be described below. The regulation cum 73 such as the above is rotated once, when the cover lever 43 is rotated once by the drive of the cover motor 42.

Figure 9:
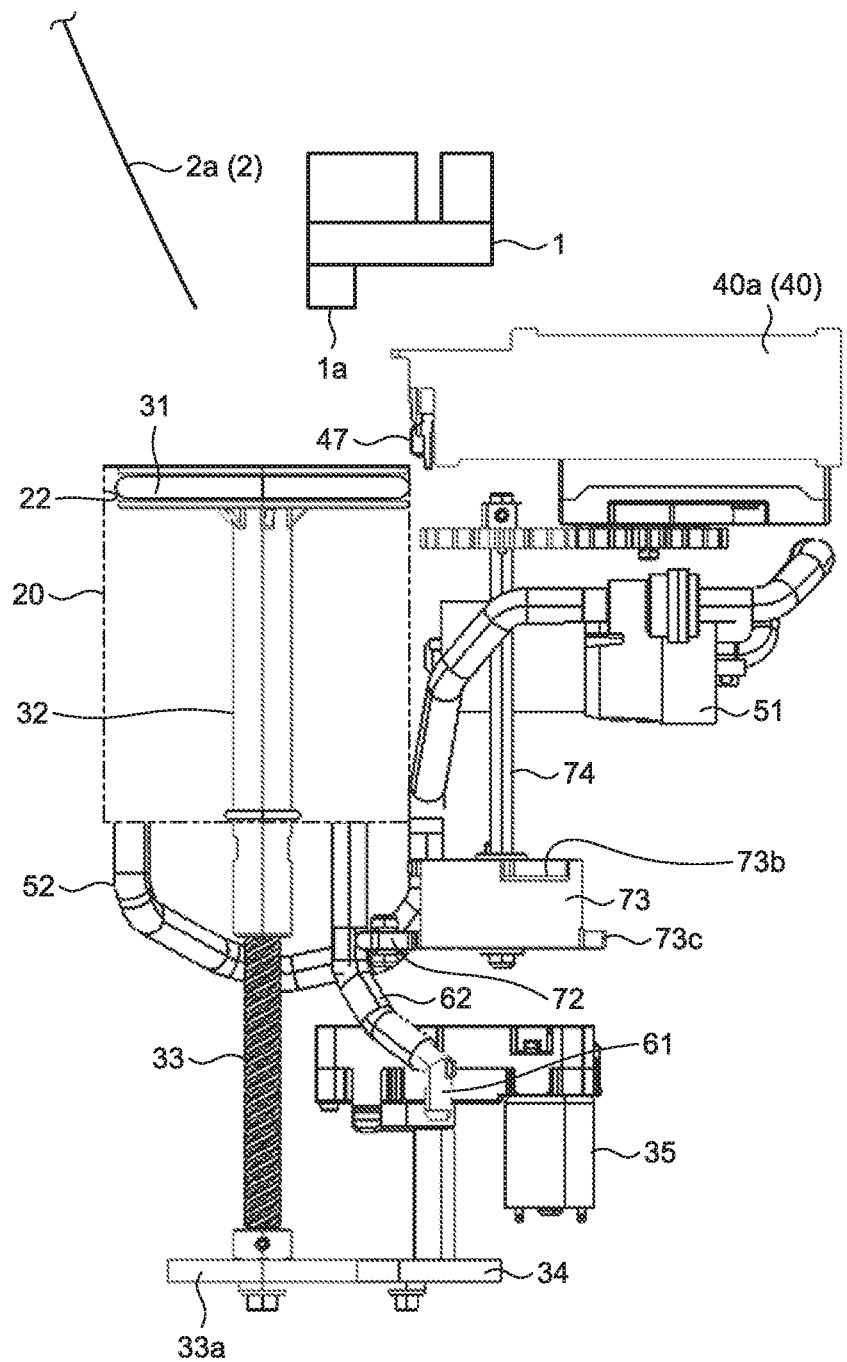
FIG. 9 is a diagram for explaining a procedure of a beverage extracting operation performed by the beverage extraction device illustrated in FIG. 1.

An extracting operation performed by the beverage extraction device 10 having the above structure will now be described. As illustrated in FIG. 9, in a standby state, the piston member 31 is disposed at the top dead point at the same height level as that of the upper surface of the cylinder 20, and is closing the upper surface opening 22.

Figure 10:
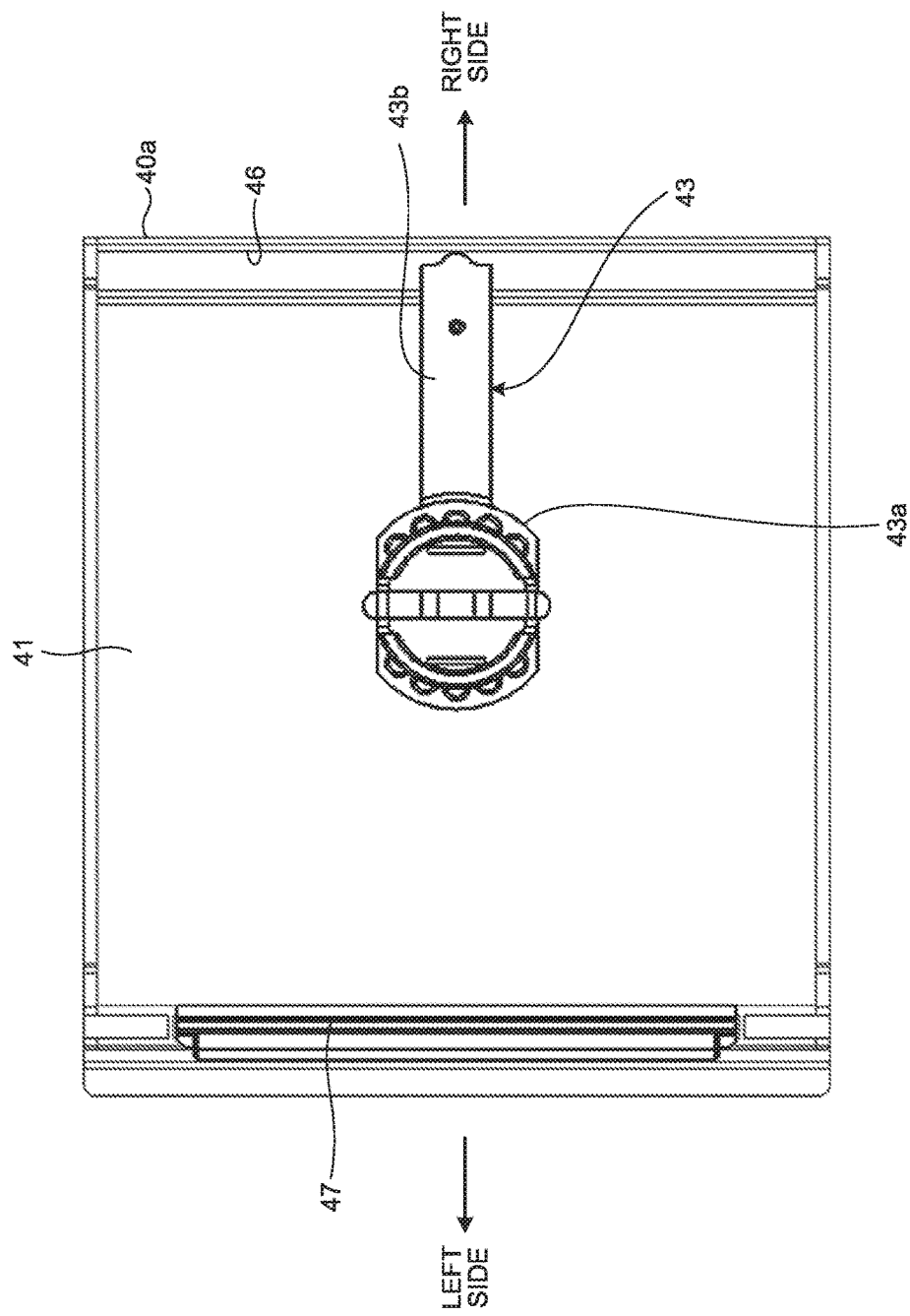
FIG. 10 is a bottom view illustrating components of a cover member and its surroundings illustrated in FIG. 9.

Moreover, as illustrated in FIG. 10, in the cover member 40*a*, the arm portion 43*b* of the cover lever 43 is extending toward the right relative to the base portion 43*a*. Consequently, the cover member 40*a*, in which the arm projection 43*c* is entering the engagement groove 46, is disposed at the right end position.

Figure 11:
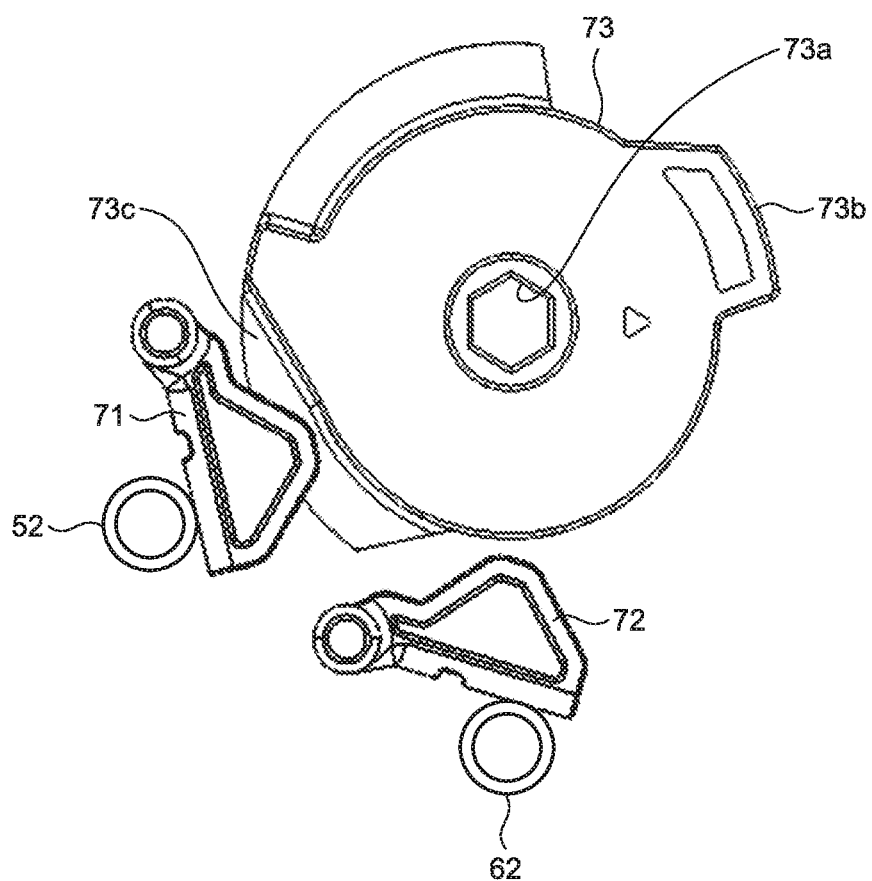
FIG. 11 is a plan view illustrating components of a regulation cum and its surroundings illustrated in FIG. 9.

Furthermore, as illustrated in FIG. 11, both the supply regulation piece 71 and the discharge regulation piece 72 are not pressed against the regulation cum 73, and are in an opened state by being respectively urged by the elastic restoring force of the supply pipe line 52 and the discharge pipe line 62.

When a start instruction is given from the above standby state, the controller 80 gives a drive instruction to the piston motor 35, and drives the piston motor 35 in the normal rotation direction. Consequently, the feed screw unit 33 rotates clockwise when viewed from the above, and the piston member 31 moves downward with the feed nut unit 32.

Figure 12:
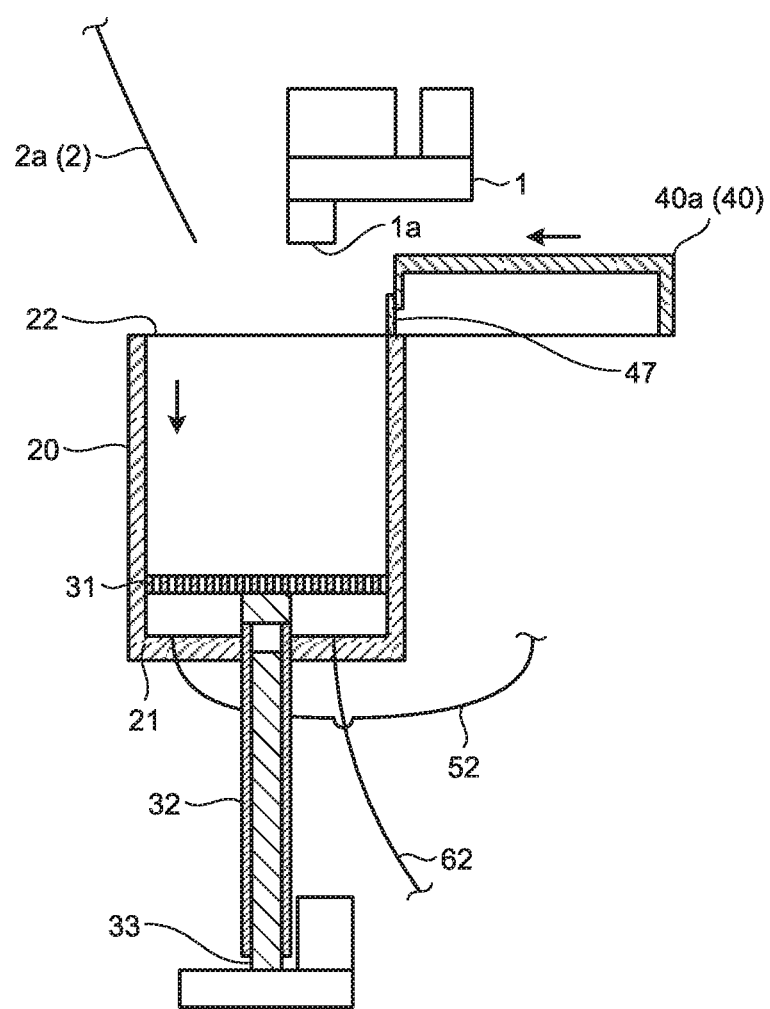
FIG. 12 is a schematic diagram for explaining the procedure of the beverage extracting operation performed by the beverage extraction device illustrated in FIG. 1.

When the piston member 31 moves to the bottom dead point where the piston member 31 approaches closest to the bottom portion 21, the controller 80 gives a drive stop instruction to the piston motor 35. As a result, as illustrated in FIG. 12, the piston member 31 will be disposed at the bottom dead point.

Figure 13:
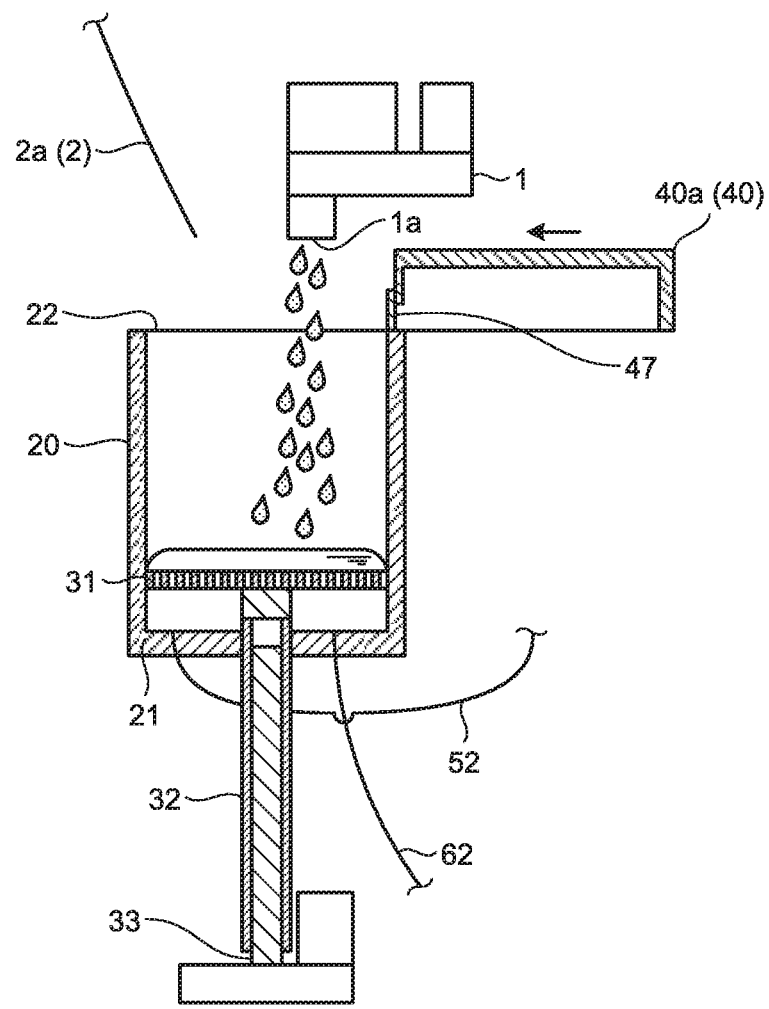
FIG. 13 is a schematic diagram for explaining the procedure of the beverage extracting operation performed by the beverage extraction device illustrated in FIG. 1.

As illustrated in FIG. 13, when a coffee raw material is fed into the cylinder 20 from the mill 1, the coffee raw material is accumulated on the upper surface of the piston member 31. When the feeding of the coffee raw material from the mill 1 is finished, the controller 80 gives a drive instruction to the cover motor 42 and drives the cover motor 42. Consequently, the cover lever 43 rotates clockwise when viewed from the above, and the cover member 40*a* moves toward the left from the right end position. When the cover motor 42 is driven as the above, the regulation cum 73 also rotates counterclockwise when viewed from the above.

Figure 14:
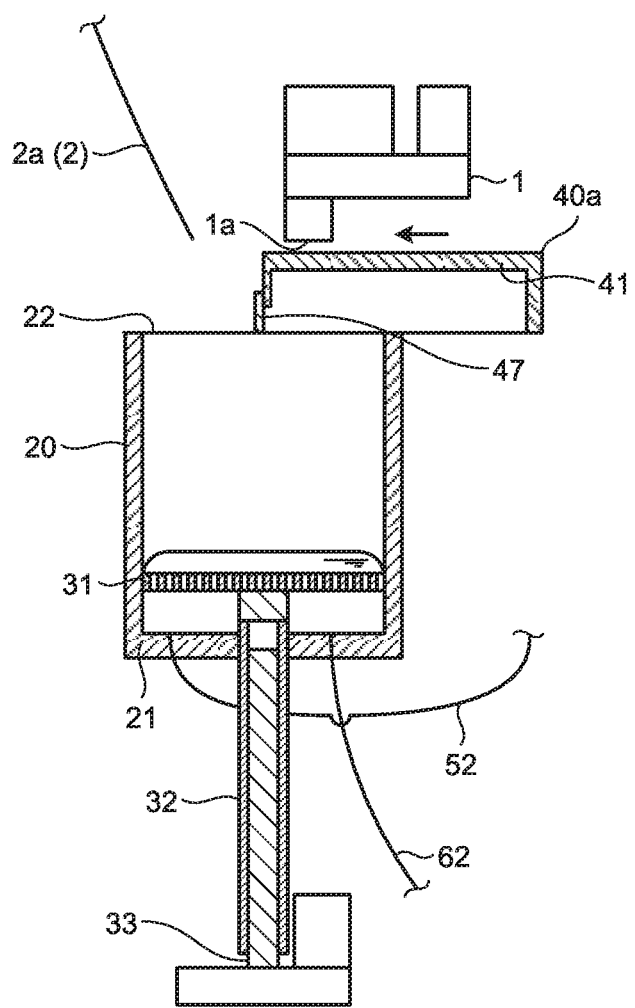
FIG. 14 is a schematic diagram for explaining the procedure of the beverage extracting operation performed by the beverage extraction device illustrated in FIG. 1.

When the cover member 40*a* moves to the midway position where the cover member 40*a* closes a part of the upper surface opening 22, the controller 80 gives a drive stop instruction to the cover motor 42. As a result, as illustrated in FIG. 14, the cover member 40*a* will be disposed in the midway position. In this case, the cover member 40*a* closes the supply port 1*a* of the mill 1 by the own upper wall portion 41.

Figure 15:
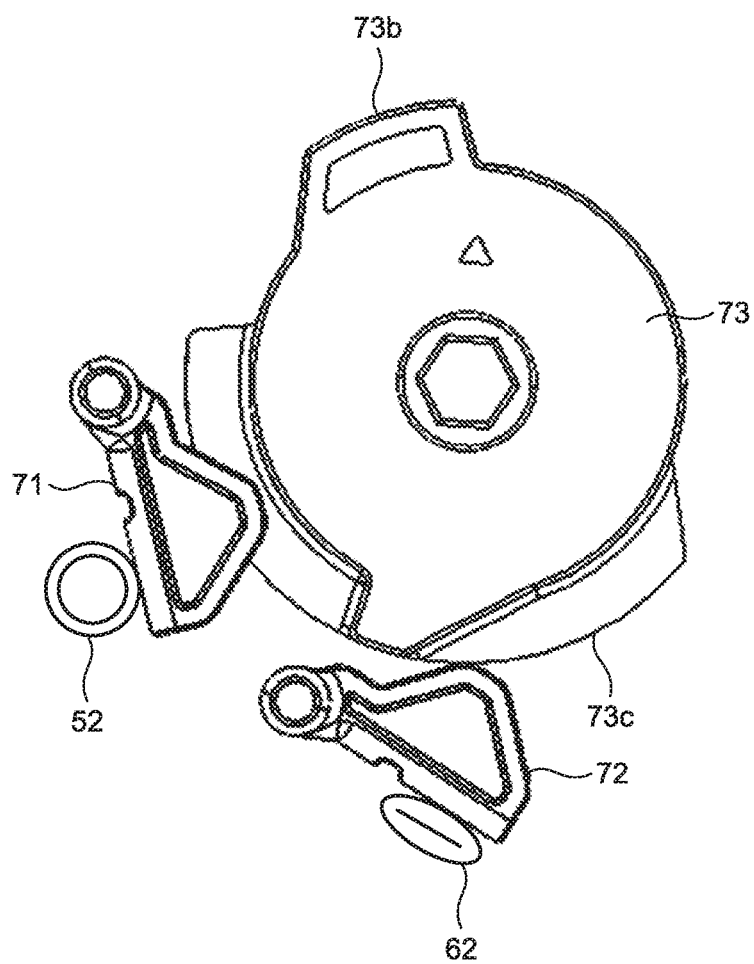
FIG. 15 is a plan view illustrating components of the regulation cum and its surroundings illustrated in FIG. 2 and FIG. 3.

Moreover, as illustrated in FIG. 15, the second regulation projection 73*c* of the regulation cum 73 is pressed against the discharge regulation piece 72. Consequently, the discharge regulation piece 72 is swung into a closed state. When the discharge regulation piece 72 is in a closed state in this manner, the discharge pipe line 62 is interposed between the discharge regulation piece 72 and the support member 30*a* described above. Hence, the passing of liquid and the like through the discharge pipe line 62 is regulated. In such a case, the supply regulation piece 71 is in an opened state without being pressed against the first regulation projection 73*b*.

Figure 16:
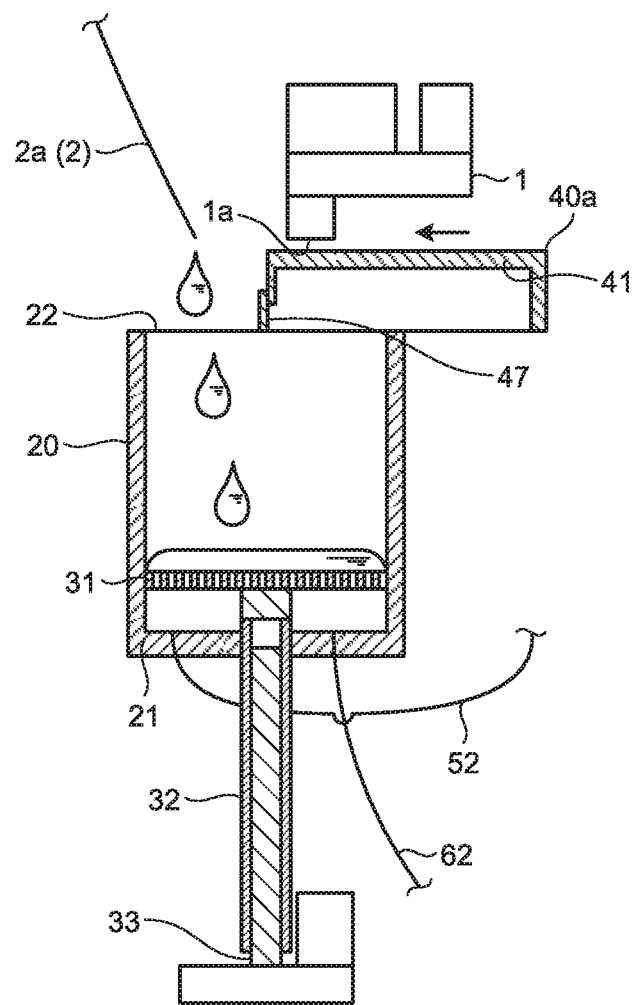
FIG. 16 is a schematic diagram for explaining the procedure of the beverage extracting operation performed by the beverage extraction device illustrated in FIG. 1.

As illustrated in FIG. 16, after the cover member 40*a* is disposed in the midway position, a predetermined amount of hot water passes through the hot water supply unit 2 from the hot water tank, and is fed to the cylinder 20.

In the cylinder 20 into which the coffee raw material and the hot water are fed in this manner, the discharge regulation piece 72 is in a closed state. Hence, air is remained in the lower portion of the piston member 31 in the midway position.

At the same time when the hot water is fed, the controller 80 drives the air pump 51. As described above, because the supply regulation piece 71 is in an opened state, the air supplied from the air pump 51 passes through the supply pipe line 52 and is supplied into the cylinder 20. Thus, the air supplied from the air pump 51 stirs the coffee raw material and the hot water. After a predetermined time has elapsed, the controller 80 gives a drive stop instruction to the air pump 51.

After giving the drive stop instruction to the air pump 51 in this manner, the controller 80 gives a drive instruction to the cover motor 42 and drives the cover motor 42. Consequently, the cover lever 43 rotates clockwise when viewed from the above, and the cover member 40*a* moves to the left end position from the midway position. When the cover motor 42 is driven as described above, the regulation cum 73 also rotates counterclockwise when viewed from the above.

Figure 17:
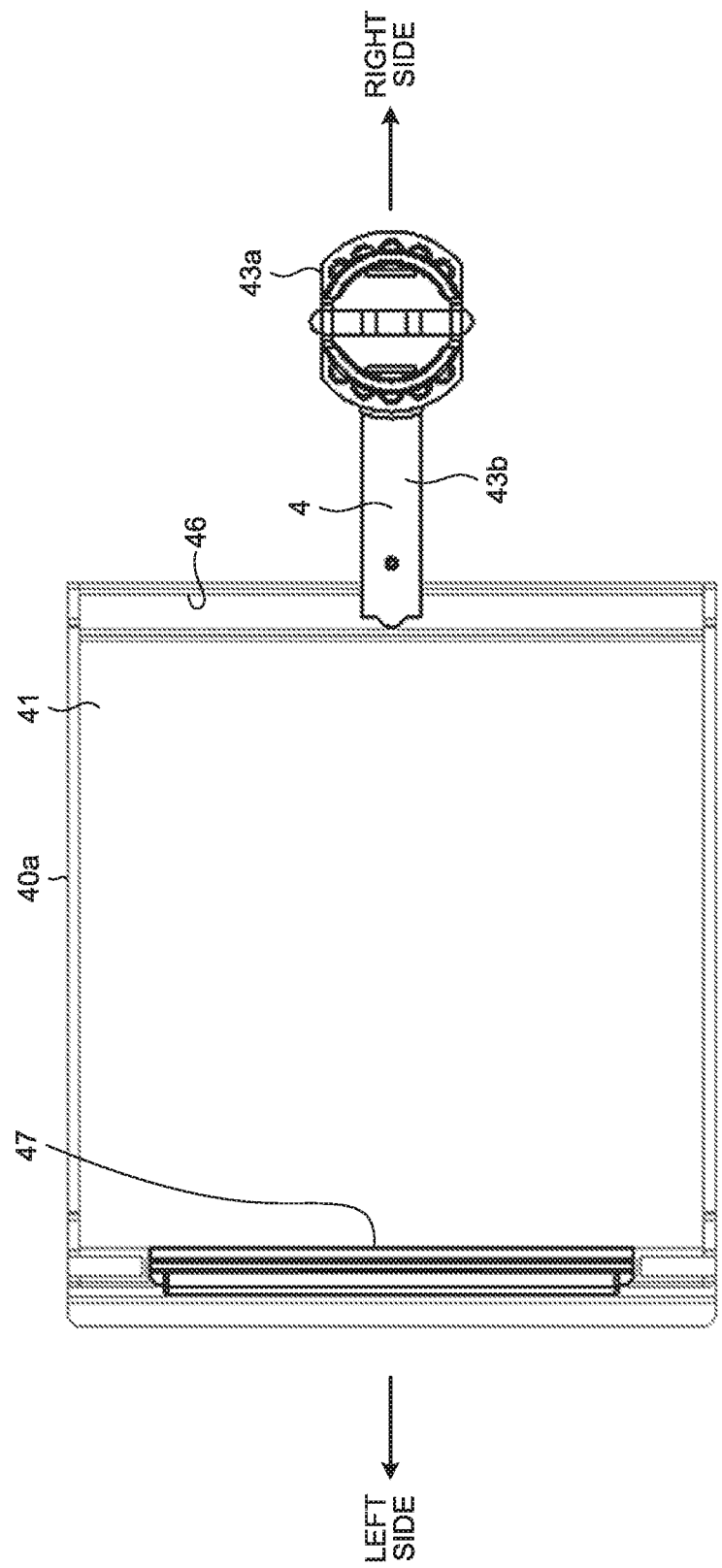
FIG. 17 is a bottom view illustrating components of the cover member and its surroundings illustrated in FIG. 2 and FIG. 3.
Figure 18:
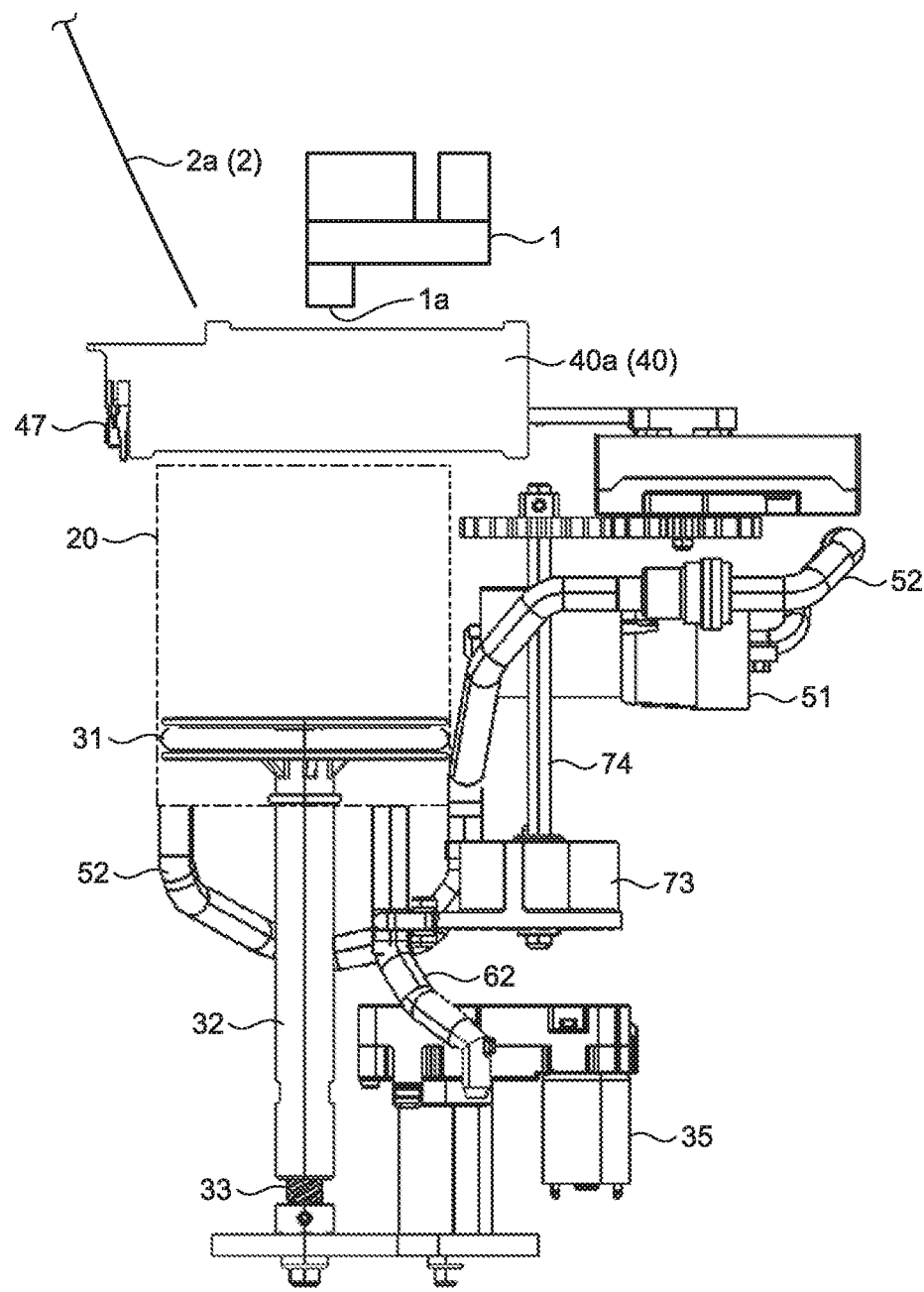
FIG. 18 is a diagram for explaining the procedure of the beverage extracting operation performed by the beverage extraction device illustrated in FIG. 1.

As illustrated in FIG. 17, when the arm portion 43*b* of the cover lever 43 extends toward the left from the base portion 43*a*, and when the cover member 40*a* moves to the left end position as illustrated in FIG. 18, the controller 80 gives a drive stop instruction to the cover motor 42. Consequently, the cover member 40*a* closes the upper surface opening 22.

Figure 19:
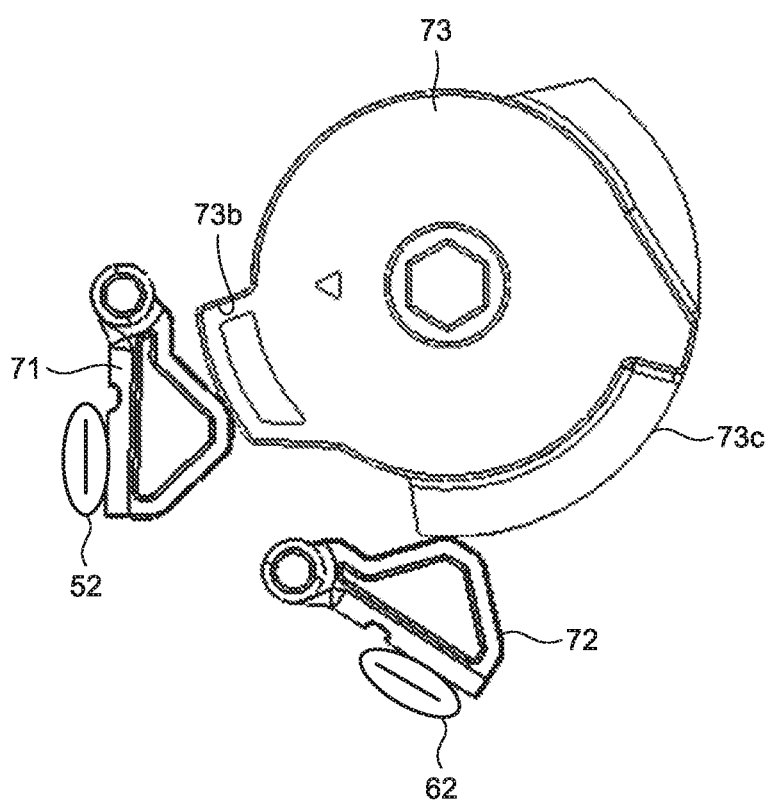
FIG. 19 is a plan view illustrating components of the regulation cum and its surroundings illustrated in FIG. 18.

When the cover member 40*a* is disposed at the left end position in this manner, as illustrated in FIG. 19, the second regulation projection 73*c* of the regulation cum 73 keeps on pressing the discharge regulation piece 72, and the discharge regulation piece 72 is maintained in a closed state.

Moreover, when the first regulation projection 73*b* is pressed against the supply regulation piece 71, the supply regulation piece 71 is swung into a closed state. When the supply regulation piece 71 is in a closed state in this manner, the supply pipe line 52 is interposed between the supply regulation piece 71 and the support member 30*a* described above. Hence, the passing of air through the supply pipe line 52 is regulated.

Figure 20:
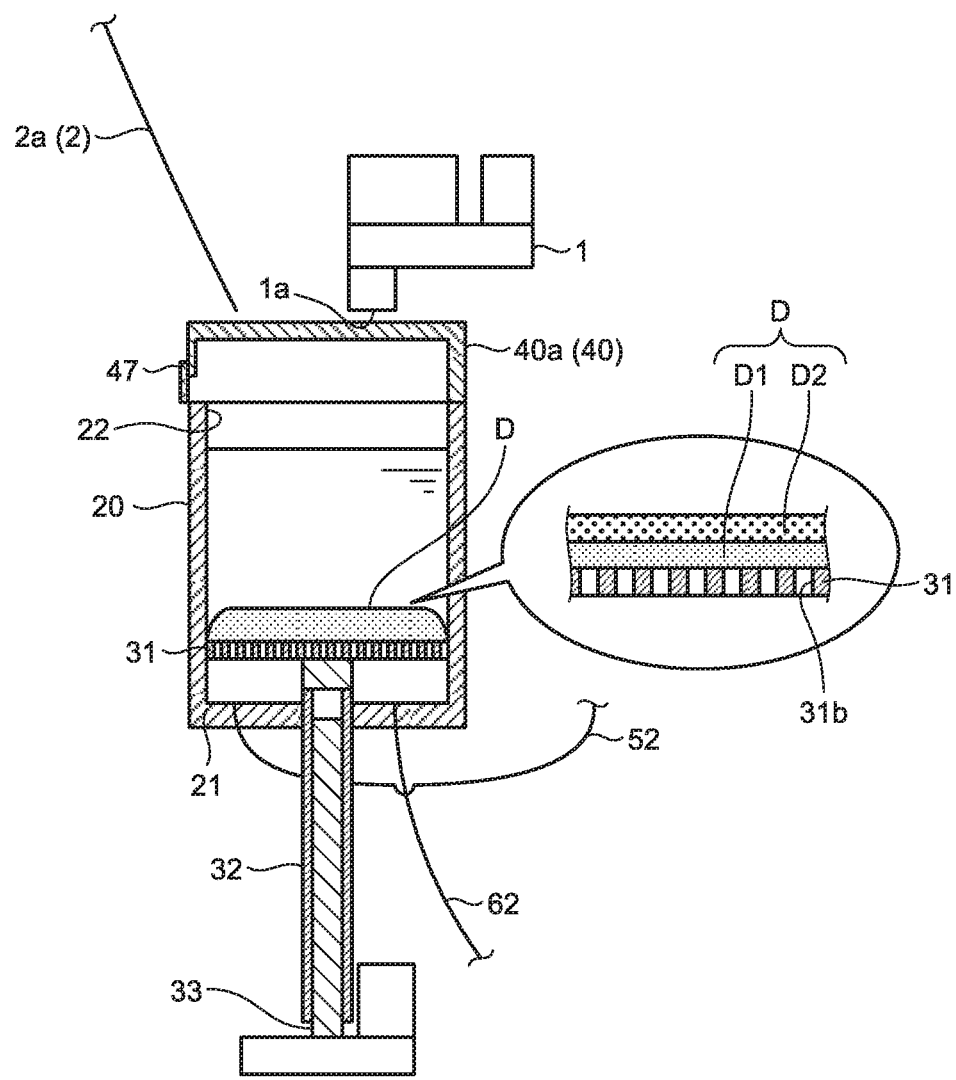
FIG. 20 is a schematic diagram for explaining the procedure of the beverage extracting operation performed by the beverage extraction device illustrated in FIG. 1.

The controller 80 then causes the piston member 31 to wait at the bottom dead point until a predetermined time (steaming time) has elapsed. Consequently, a coffee raw material that is obtained after stirring the coffee raw material and the hot water settles on the upper surface of the piston member 31 and becomes deposit D. As illustrated in an enlarged drawing in FIG. 20, a fine powder coffee raw material (hereinafter, may also be referred to as a fine powder raw material) D1 is settled on the upper surface of the piston member 31. A coffee raw material (hereinafter, may also be referred to as a powder raw material) D2 the diameter of which is larger than that of the fine powder raw material D1 is settled above the fine powder raw material D1.

Then, the controller 80 gives a drive instruction to the piston motor 35, and drives the piston motor 35 in the reverse rotation direction. Consequently, the feed screw unit 33 rotates counterclockwise when viewed from the above, and the piston member 31 moves upward with the feed nut unit 32.

Figure 21:
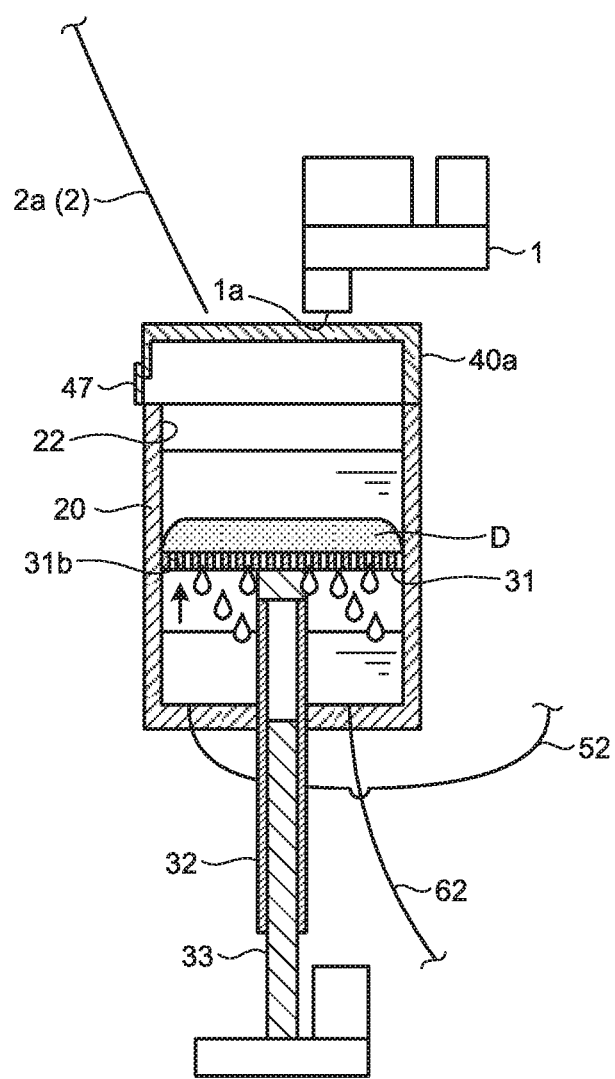
FIG. 21 is a schematic diagram for explaining the procedure of the beverage extracting operation performed by the beverage extraction device illustrated in FIG. 1.

As illustrated in FIG. 21, when the piston member 31 moves upward in this manner, the liquid obtained by stirring the coffee raw material and the hot water passes through the through holes 31b, and a coffee beverage can be extracted below the piston member 31.

In this case, because the stirred liquid passes through the deposit D on the piston member 31, the extracted coffee beverage has been filtered.

Figure 22:
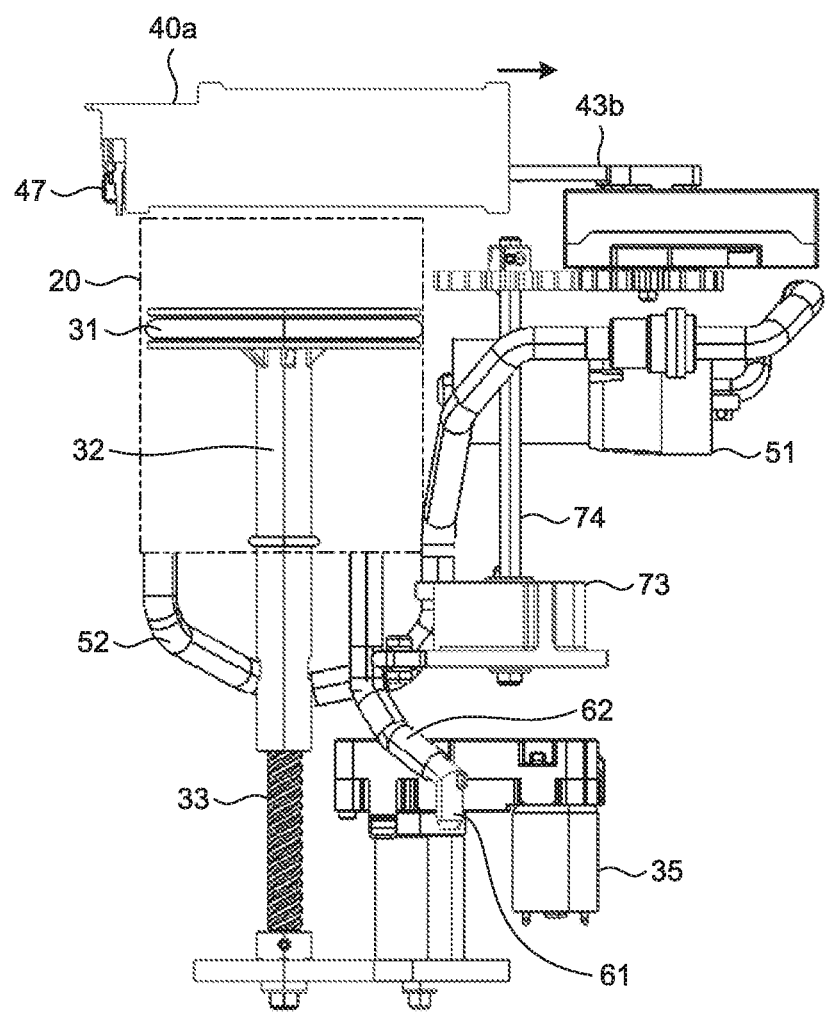
FIG. 22 is a diagram for explaining the procedure of the beverage extracting operation performed by the beverage extraction device illustrated in FIG. 1.

As illustrated in FIG. 22, when the piston member 31 reaches a predetermined height level, the controller 80 gives a drive instruction to the cover motor 42 and drives the cover motor 42. Consequently, the cover lever 43 rotates clockwise when viewed from the above, and the cover member 40a moves toward the right from the left end position.

Figure 23:
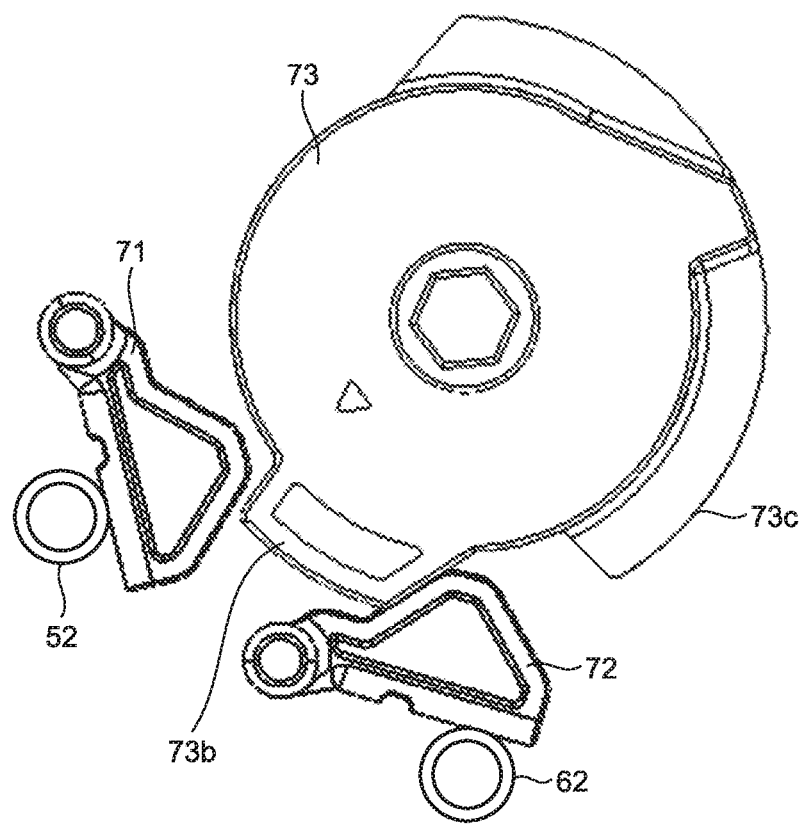
FIG. 23 is a plan view illustrating components of the regulation cum and its surroundings illustrated in FIG. 22.

Moreover, the regulation cum 73 also rotates counterclockwise when viewed from the above, by the drive of the cover motor 42. Thus, as illustrated in FIG. 23, the supply regulation piece 71 is released from the state of being pressed against the first regulation projection 73b, and the supply regulation piece 71 is swung into an opened state by the elastic restoring force of the supply pipe line 52. The discharge regulation piece 72 is also released from the state of being pressed against the second regulation projection 73c, and the discharge regulation piece 72 is swung into an opened state by the elastic restoring force of the discharge pipe line 62. As a result, the coffee beverage stored in the cylinder 20 passes through the discharge passage 60, and is discharged into a beverage container 3 (see FIG. 1).

When a predetermined amount of coffee beverage is discharged into the beverage container 3 in this manner, a coffee beverage is served to the user.

Figure 24:
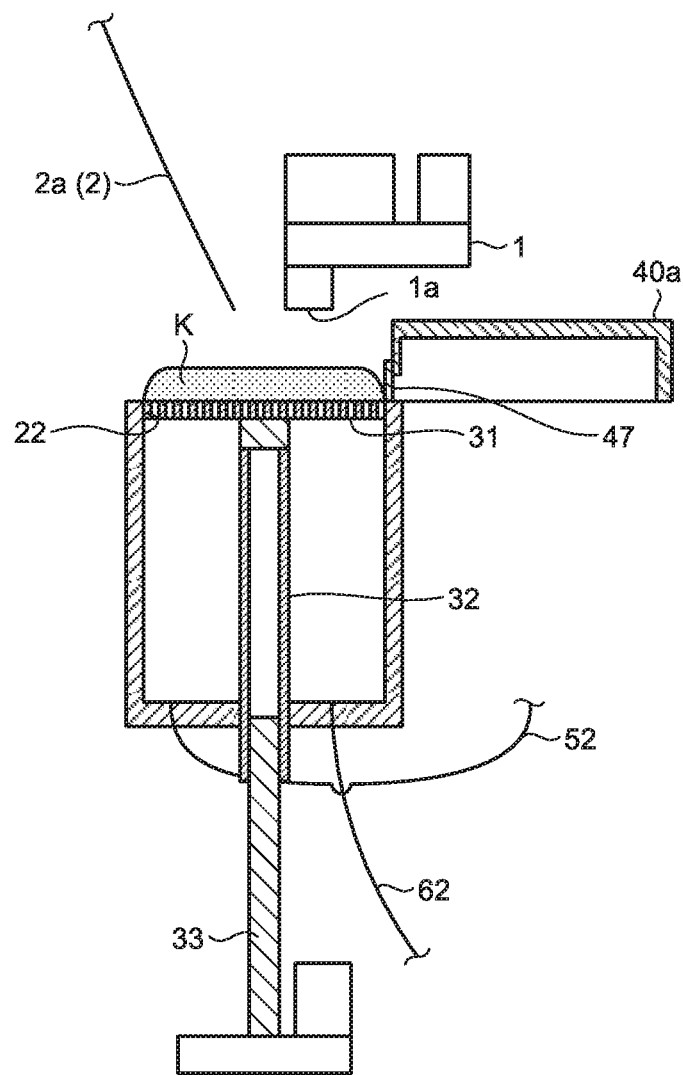
FIG. 24 is a schematic diagram for explaining the procedure of the beverage extracting operation performed by the beverage extraction device illustrated in FIG. 1.
Figure 25:
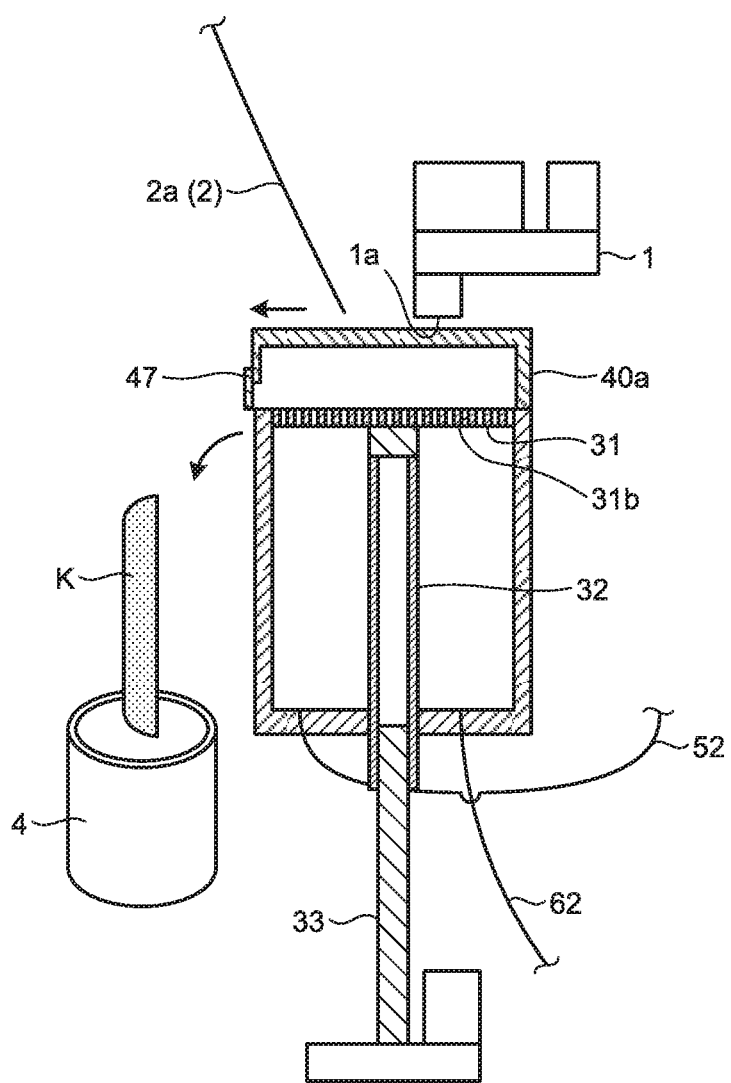
FIG. 25 is a schematic diagram for explaining the procedure of the beverage extracting operation performed by the beverage extraction device illustrated in FIG. 1.

As illustrated in FIG. 24, when the piston member 31 is disposed at the top dead point, the controller 80 gives a drive stop instruction to the piston motor 35. In this process, an extraction residue K is placed on the upper surface of the piston member 31. When the cover member 40a then reaches the right end position, the controller 80 does not give a drive stop instruction to the cover motor 42, and causes the cover motor 42 to keep on driving. Consequently, the cover member 40a moves toward the left end position. In this case, the scraper portion 47 of the cover member 40a comes into contact with the upper surface of the piston member 31 at the top dead point in a slidable manner. Hence, the scraper portion 47 scrapes off the extraction residue K on the upper surface of the piston member 31, and as illustrated in FIG. 25, the extraction residue K can be collected in a residue receptacle 4 that is disposed at the left side of the cylinder 20.

The controller 80 causes the cover motor 42 to keep on driving, and when the cover member 40a reaches the right end position again, the controller 80 gives a drive stop instruction to the cover motor 42, and then the above described standby state is restored.

As described above, in the beverage extraction device 10 according to the embodiment of the disclosure, the scraper portion 47 of the cover member 40a removes the extraction residue K on the piston member 31 for closing the upper surface opening 22, while the cover member 40a moves to the left end position from the right end position. Consequently, it is possible to install the residue receptacle 4 for collecting the extraction residue K beside the cylinder 20. Thus, it is possible to sufficiently increase the capacity of the residue receptacle 4, while preventing the height dimension of the installation area of the beverage extraction device 10 and the residue receptacle 4 from increasing. Hence, it is possible to increase the storage amount of the extraction residue K.

Because the storage amount of the extraction residue K can be increased in this manner, it is possible to reduce the number of times the discarding process on the residue receptacle 4 is to be performed, relative to the number of times the coffee beverage is served. Hence, it is possible to reduce the load of an administrator of the beverage server and the like to which the beverage extraction device 10 is applied.

In the beverage extraction device 10 described above, the cover motor 42 that is a drive source of the cover member 40a is commonly used as the drive source for swinging the supply regulation piece 71 and the discharge regulation piece 72. Consequently, the controller 80 can control the operations of the cover member 40a, the discharge regulation piece 72, and the supply regulation piece 71, by driving or stop driving the cover motor 42. In this manner, when a part of the drive source is commonly used, it is possible to reduce the size of the entire device as well as the manufacturing cost.

The beverage extraction device 10 described above, upon receiving a start instruction, causes the piston member 31 to be disposed at the bottom dead point where the piston member 31 approaches closest to the bottom portion 21, causes the discharge regulation piece 72 to be turned into a closed state when the coffee raw material is fed to the upper surface of the piston member 31, and thereafter drives the air pump 51 while maintaining the supply regulation piece 71 in an opened state when the hot water is fed into the cylinder 20. Consequently, it is possible to stir the coffee raw material and the hot water by the air supplied from the air pump 51. Moreover, by driving the air pump 51 when the hot water is fed into the cylinder 20, it is possible to prevent the hot water from passing through the mesh member 31c and flowing below the piston member 31. In this manner, by preventing the fed hot water fed from flowing below the piston member 31, the hot water is favorably mixed with the coffee raw material. Thus, it is possible to improve the concentration of the extracted coffee beverage and improve the extraction efficiency.

In the beverage extraction device 10 described above, the cover member 40a is disposed in the midway position when the hot water is fed, and closes the supply port 1a of the mill 1. Thus, it is possible to prevent the supply port 1a of the mill 1 from being closed by the steam reaching the mill 1.

While the preferable embodiment of the disclosure has been described, the disclosure is not limited to the above, and various modifications may be possible.

In the embodiment described above, the air pump 51 is stopped driving when the coffee beverage inside the cylinder 20 is discharged. However, in the disclosure, the air pump may be driven when the coffee beverage is discharged. By doing so, it is possible to lower the temperature of the coffee beverage by the air supplied into the cylinder from the air pump. In other words, it is possible to lower the temperature of the coffee beverage suitable for serving, while the concentration of the coffee beverage is kept. Consequently, it is possible to improve the quality of the beverage to be served.

In the embodiment described above, the piston member 31 is moved upward when the controller 80 gives the drive instruction to the piston motor 35 and drives the piston motor 35 in the reverse rotation direction, after a predetermined time of the steaming time has elapsed. However, in the disclosure, residual pressure below the piston member in the cylinder may be released outside, after the steaming time has elapsed. Various methods may be available for releasing the above residual pressure, and the specific method includes a method of releasing the residual pressure below the piston member to the outside, by opening a pinch that closes a release pipe connected to the bottom portion of the cylinder. By releasing the residual pressure to the outside in this manner, the pressure below the piston member can be made negative, immediately after the extracting operation of moving the piston member upward is started. Hence, it is possible to minimize the moving distance of the piston member.

Figure 26:
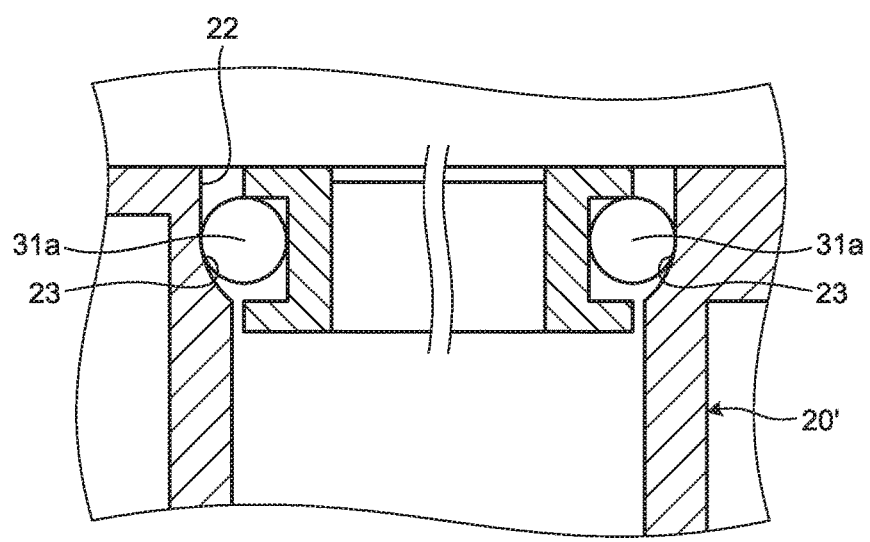
FIG. 26 is a longitudinal sectional view of an enlarged main part of a modification of the beverage extraction device according to the embodiment of the disclosure.

Although not specifically referred to in the embodiment described above, as illustrated in FIG. 26, a concave portion 23 may be formed on the periphery portion of the upper surface opening 22 of a cylinder 20'. By forming the concave portion 23 such as the above, compression distortion of the packing 31a is relaxed when a part of the packing 31a enters the concave portion 23 during a standby state, in other words, while the piston member 31 is disposed at the top dead point and is closing the upper surface opening 22. When the compression distortion of the packing 31a is relaxed in this manner, it is possible to increase the usage life of the packing 31a, and as a result, it is possible to reduce the replacement frequency of the packing 31a.

According to some embodiments, the scraper portion removes the extraction residue on the piston member for closing the upper surface opening while discharging the extracted beverage, when the cover member moves from one to another of the fully opened position where the upper surface opening of the cylinder is fully opened and the fully closed position where the upper surface opening is closed. Consequently, it is possible to install the residue receptacle for collecting the extraction residue beside the cylinder. Thus, it is possible to sufficiently increase the capacity of the residue receptacle, while preventing the height dimension of the installation area of the beverage extraction device and the residue receptacle from increasing. Hence, it is possible to advantageously increase the storage amount of the extraction residue.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A beverage extraction device, comprising:
a cylinder having a bottomed cylindrical shape;
a piston member including a plurality of through holes and having a disk shape, the piston member being configured to move close to and away from a bottom portion of the cylinder in a state that a side surface of the piston member is in contact with an inner surface of the cylinder, the beverage extraction device being configured to extract a beverage from a beverage raw material and hot water that are fed through an upper surface opening of the cylinder by a movement of the piston member and discharge the extracted beverage through a discharge passage connected to the bottom portion; and
a cover member configured to move between a fully opened position at which the upper surface opening is fully opened and a fully closed position at which the upper surface opening is closed, wherein
the cover member includes a scraper portion configured to remove an extraction residue placed on the piston member closing the upper surface opening when the cover member moves from one to another of the fully opened position and the fully closed position.

2. The beverage extraction device according to claim 1, further comprising:
an air supply passage that is connected to the bottom portion, the air supply passage supplying air from an air supply unit into the cylinder;
a discharge regulation member configured to open and close the discharge passage, the discharge regulation member allowing the beverage to pass through the discharge passage in an opened state and regulating the beverage to pass through the discharge passage in a closed state; and
an air supply regulation member configured to open and close the air supply passage, the air supply regulation member allowing the air to pass through the air supply passage in an opened state and regulating air to pass through the air supply passage in a closed state, wherein
the cover member is driven by a drive source commonly used to the discharge regulation member and the air supply regulation member.

3. The beverage extraction device according to claim 2, further comprising a controller configured to dispose the piston member at a bottom dead point at which the piston member approaches closest to the bottom portion, upon receiving a start instruction, and drive the air supply unit while keeping the discharge regulation member in the closed state and the air supply regulation member in the opened state when the hot water is fed into the cylinder.

4. The beverage extraction device according to claim 3, wherein the cover member is configured to move to be disposed at a midway position where a part of the upper surface opening of the cylinder is closed, the midway position being a position between the fully opened position and the fully closed position, and when the cover member is disposed at the midway position, the cover member closes a supply port of a supply unit for supplying the beverage raw material while allowing the hot water to be fed into the cylinder through the upper surface opening.

5. The beverage extraction device according to claim 2, wherein the cover member is configured to move to be disposed at a midway position where a part of the upper surface opening of the cylinder is closed, the midway position being a position between the fully opened position and the fully closed position, and when the cover member is disposed at the midway position, the cover member closes a supply port of a supply unit for supplying the beverage raw material while allowing the hot water to be fed into the cylinder through the upper surface opening.

6. The beverage extraction device according to claim 1, wherein the cover member is configured to move to be disposed at a midway position where a part of the upper surface opening of the cylinder is closed, the midway position being a position between the fully opened position and the fully closed position, and when the cover member is disposed at the midway position, the cover member closes a supply port of a supply unit for supplying the beverage raw material while allowing the hot water to be fed into the cylinder through the upper surface opening.

* * * * *